(12) United States Patent
Hinckley et al.

(10) Patent No.: US 11,144,275 B1
(45) Date of Patent: Oct. 12, 2021

(54) METHOD FOR SHARING CONTENT AND TOOLS INDEPENDENTLY FROM DEVICES, APPLICATIONS, USERS, AND TIMES

(71) Applicant: Microsoft Technology Licensing, LLC, Redmond, WA (US)

(72) Inventors: Kenneth P. Hinckley, Kirkland, WA (US); Michel Pahud, Kirkland, WA (US); Jonathan D. Goldstein, Woodinville, WA (US); Frederik Martin Brudy, London (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/914,964

(22) Filed: Jun. 29, 2020

(51) Int. Cl.
  *G06F 16/27* (2019.01)
  *G06F 3/14* (2006.01)
  *H04L 29/08* (2006.01)
  *G06F 9/451* (2018.01)
  *G06F 3/0481* (2013.01)

(52) U.S. Cl.
  CPC ........ *G06F 3/1454* (2013.01); *G06F 3/04812* (2013.01); *G06F 9/451* (2018.02); *G06F 16/27* (2019.01); *H04L 67/1095* (2013.01)

(58) Field of Classification Search
  CPC ........ G06F 3/1454; G06F 9/451; G06F 16/27; G06F 3/04812; G06F 3/048; H04L 67/1095
  See application file for complete search history.

(56) References Cited

U.S. PATENT DOCUMENTS

| | | | |
|---|---|---|---|
| 9,395,893 B1 * | 7/2016 | Beausoleil | G06F 40/166 |
| 2016/0028796 A1 * | 1/2016 | Garcia | H04L 67/1095 |
| | | | 715/738 |
| 2018/0267989 A1 * | 9/2018 | von Muhlen | G06F 16/14 |

OTHER PUBLICATIONS

"All Your Devices. One Seamless Experience", Retrieved From: https://web.archive.org/web/20190930200153/https://www.apple.com/macos/continuity/, Sep. 30, 2019, 13 Pages.

Alduaij, et al., "Heterogeneous Multi-Mobile Computing", In Proceedings of the 17th Annual International Conference on Mobile Systems, Applications, and Services, Jun. 17, 2019, pp. 494-507.

(Continued)

*Primary Examiner* — Jeanette J Parker

(57) ABSTRACT

Systems and methods relate to sharing content and data across users and devices. A shared folios include media primitives and tools as its constituents. The use of shared folios addresses an issue of reliably and efficiently transfer user activities with data. The use addresses scenarios of both single-user work utilizing multiple devices and collaborative work among users utilizing multiple devices. The media primitive includes content in various data types. The tool include data and access to the data by devices and applications. A data distributor manages automatic synchronization of the folios across devices using centralized and distributed transaction logs The folios are synchronized with resiliency against failure in client devices. The folio and its constituents are interactively accessible through top-level, semi-transparent user interface. The media primitive and the tools may programmatically access local applications to automatically transfer user activities among users and devices.

20 Claims, 17 Drawing Sheets

(56) References Cited

OTHER PUBLICATIONS

Amant, et al., "Characterizing Tool use in an Interactive Drawing Environment", In Proceedings of the 2nd International Symposium on Smart graphics, Jun. 11, 2002, pp. 86-93.
Bardram, et al., "Activity-Centric Computing Systems", In Journal Communications of the ACM, vol. 62, Issue 8, Aug. 2019, pp. 72-81.
Bardram, et al., "ReticularSpaces: Activity-Based Computing Support for Physically Distributed and Collaborative Smart Spaces", In Proceedings of the SIGCHI Conference on Human Factors in Computing Systems, May 5, 2012, pp. 2845-2854.
Bederson, et al., "Local Tools: An Alternative to Tool Palettes", In Proceedings of the 9th annual ACM Symposium on User Interface Software and Technology, Nov. 6, 1996, pp. 169-170.
Bier, et al., "Toolglass and Magic Lenses: The See-Through Interface", In Proceedings of the 20th Annual Conference on Computer Graphics and Interactive Techniques, Aug. 2, 1993, pp. 73-80.
Boardman, et al., "Stuff Goes into the Computer and Doesn't Come Out" A Cross-tool Study of Personal Information Management, In Proceedings of the SIGCHI Conference on Human Factors in Computing Systems, Apr. 24, 2004, pp. 583-590.
Bondarenko, et al., "Documents at Hand: Learning from Paper to Improve Digital Technologies", In Proceedings of the SIGCHI Conference on Human factors in Computing Systems, Apr. 2, 2005, pp. 121-130.
Brudy, et al., "Cross-Device Taxonomy: Survey, Opportunities and Challenges of Interactions Spanning Across Multiple Devices", In Proceedings of the CHI Conference on Human Factors in Computing Systems, May 4, 2019, 28 Pages.
Butler, et al., "HabilisDraw DT: A Bimanual Tool-Based Direct Manipulation Drawing Environment", In Proceedings of the Conference on Human Factors in Computing Systems, Apr. 24, 2004, pp. 1301-1304.
Buxton, William, "Chunking and Phrasing and the Design of Human-Computer Dialogues", In Proceedings of the IFIP 10th World Computer Congress, Sep. 1, 1986, 9 Pages.
Buxton, Bill, "Integrating the Periphery and Context: A New Taxonomy of Telematics", In Proceedings of Graphics Interface, May, 1995, 8 Pages.
Yang, et al., "Panelrama: Enabling Easy Specification of Cross-Device Web Applications", In Proceedings of the SIGCHI Conference on Human Factors in Computing Systems, Apr. 26, 2014, pp. 2783-2792.
Dourish, et al., "Portholes: Supporting Awareness in a Distributed Work Group", In Proceedings of the SIGCHI Conference on Human Factors in Computing Systems, May 3, 1992, pp. 541-547.
Fitzmaurice, et al., "Sentient Data Access Via a Diverse Society of Devices", In Journal of Queue, vol. 1, Issue 8, Nov. 2003, pp. 52-62.
Fitzmaurice, et al., "Tracking Menus", In Proceedings of the 16th Annual ACM Symposium on User Interface Software and Technology, Nov. 2, 2003, pp. 71-80.
Gellersen, et al., "Supporting Device Discovery and Spontaneous Interaction with Spatial References", In Journal of Personal and Ubiquitous Computing, vol. 13, Issue 4, Jul. 3, 2008, pp. 255-264.
Goldstein, et al., "A.M.B.R.O.S.I.A: Providing Performant Virtual Resiliency for Distributed Applications", In Proceedings of the VLDB Endowment, vol. 13, Issue 5, Jan. 2020, pp. 588-601.
Greenberg, et al., "Customizable Physical Interfaces for Interacting with Conventional Applications", In Proceedings of the 15th Annual ACM Symposium on User Interface Software and Technology, Oct. 27, 2002, pp. 31-40.
Greenberg, et al., "Usability Evaluation Considered Harmful (Some of the Time)", In Proceedings of the SIGCHI Conference on Human Factors in Computing Systems, Apr. 5, 2008, pp. 111-120.
Grudin, Jonathan, "Partitioning Digital Worlds: Focal and Peripheral Awareness in Multiple Monitor Use", In Proceedings of the SIGCHI Conference on Human Factors in Computing Systems, Mar. 31, 2001, pp. 458-465.

Grudin, Jonathan, "The Case Against User Interface Consistency", In Journal of Communications of the ACM, vol. 32, Issue 10, Oct. 1989, pp. 1164-1173.
Gutwin, et al., "A Descriptive Framework of Workspace Awareness for Real-Time Groupware", In Journal of Computer Supported Cooperative Work (CSCW), vol. 11, Issue 3-4, Sep. 2002, pp. 411-446.
Hailpern, et al., "TEAM STORM: Demonstrating an Interaction Model for Working with Multiple Ideas During Creative Group Work", In Proceedings of the 6th ACM SIGCHI Conference on Creativity & Cognition, Jun. 13, 2007, pp. 193-202.
Hamilton, et al., "Conductor: Enabling and Understanding Cross-Device Interaction", In Proceedings of the SIGCHI Conference on Human Factors in Computing Systems, Apr. 26, 2014, pp. 2773-2782.
Hardock, et al., "A Marking Based Interface for Collaborative Writing", In Proceedings of the 6th Annual ACM Symposium on User Interface Software and Technology, Nov. 3, 1993, pp. 259-266.
Henderson, et al., "Rooms: The Use of Multiple Virtual Workspaces to Reduce Space Contention in a Window-Based Graphical User Interface", In Journal of ACM Transactions on Graphics (TOG), vol. 5, Issue 3, Jul. 1986, pp. 211-243.
Hinckley, et al., "Informal Information Gathering Techniques for Active Reading", In Proceedings of the SIGCHI Conference on Human Factors in Computing Systems, May 5, 2012, pp. 1893-1896.
Hollan, et al., "Distributed Cognition: Toward a New Foundation for Human-Computer Interaction Research", In Journal of ACM Transactions on Computer-Human Interaction (TOCHI), vol. 7, Issue 2, Jun. 2000, pp. 174-196.
Hourcade, et al., "KidPad: Collaborative Storytelling for Children", In Proceedings of the Conference on Human Factors in Computing Systems, Apr. 20, 2002, pp. 500-501.
Jacob, et al., "Reality-Based Interaction: A Framework for Post-WIMP Interfaces", In Proceedings of the SIGCHI Conference on Human Factors in Computing Systems, Apr. 5, 2008, pp. 201-210.
Johnson, et al., "The Xerox Star: A Retrospective", In Journal of Computer, vol. 22, Issue 9, Sep. 1989, pp. 11-26.
Kidd, Alison, "The Marks are on the Knowledge Worker", In Proceedings of the SIGCHI Conference on Human Factors in Computing Systems, Apr. 24, 1994, pp. 186-191.
Kirsh, David, "The Intelligent Use of Space", In Journal of Artificial Intelligence, vol. 73, Issues 1-2, Feb. 1995, pp. 31-68.
Klokmose, et al., "VIGO: Instrumental Interaction in Multi-Surface Environments", In Proceedings of the SIGCHI Conference on Human Factors in Computing Systems, Apr. 4, 2009, pp. 869-878.
Klokmose, et al., "Webstrates: Shareable Dynamic Media", In Proceedings of the 28th Annual ACM Symposium on User Interface Software & Technology, Nov. 8, 2015, pp. 280-290.
Kramer, Axel, "Translucent Patches-Dissolving Windows", In Proceedings of the 7th Annual ACM Symposium on User Interface Software and Technology, Nov. 2, 1994, pp. 121-130.
Lafon, Michel Beaudouin., "Instrumental Interaction: An Interaction Model for Designing Post-WIMP User Interfaces", In Proceedings of the SIGCHI conference on Human Factors in Computing Systems, Apr. 1, 2000, pp. 446-453.
Lafon, et al., "Reification, Polymorphism and Reuse: Three Principles for Designing Visual Interfaces", In Proceedings of the Working Conference on Advanced Visual Interfaces, May 23, 2000, pp. 102-109.
Ledo, et al., "Evaluation Strategies for HCI Toolkit Research", In Proceedings of the CHI Conference on Human Factors in Computing Systems, Apr. 21, 2018, 17 Pages.
Luff et al. "Mobility in Collaboration", In Proceedings of the ACM Conference on Computer Supported Cooperative Work, Nov. 14, 1998, pp. 305-314.
Malone, Thomas W., "How Do People Organize their Desks? Implications for the Design of Office Information Systems", In Journal of ACM Transactions on Information Systems (TOIS),vol. 1, Issue 1, Jan. 1983, pp. 99-112.
Marquardt, et al., "Gradual Engagement: Facilitating Information Exchange between Digital Devices as a Function of Proximity", In Proceedings of the ACM International Conference on Interactive Tabletops and Surfaces, Nov. 11, 2012, pp. 31-40.

(56) References Cited

OTHER PUBLICATIONS

Marshall, et al., "Saving and Using Encountered Information: Implications for Electronic Periodicals", In Proceedings of the SIGCHI Conference on Human Factors in Computing Systems, Apr. 2, 2005, pp. 111-120.
Myers, et al., "Past, Present, and Future of User Interface Software Tools", In Journal of ACM Transactions on Computer-Human Interaction (TOCHI), vol. 7, Issue 1, Mar. 2000, pp. 3-28.
Nielsen, Jakob, "Usability Engineering", Published by Academic Press, Inc, 1993, 377 Pages.
Norman, Don, "The Design of Everyday Things: Revised and Expanded Edition", Published by Basic Books, 2013, 369 Pages.
Olsen, et al., "Evaluating User Interface Systems Research", In Proceedings of the 20th Annual ACM Symposium on User Interface Software and Technology, Oct. 7, 2007, pp. 251-258.
Rekimoto, Jun, "Time-Machine Computing: A Time-centric Approach for the Information Environment", In Proceedings of the 12th Annual ACM Symposium on User Interface Software and Technology, Nov. 7, 1999, pp. 45-54.
Robertson, George G., "Fix and Float: Object Movement by Egocentric Navigation", In Proceedings of the 10th Annual ACM Symposium on User Interface Software and Technology, Oct. 14, 1997, pp. 149-150.
Roseman, et al., "GROUPKIT: A Groupware Toolkit for Building Real-Time Conferencing Applications", Published in Human-Computer Interaction, 1995, pp. 390-397.
Santosa, et al., "A Field Study of Multi-Device Workflows in Distributed Workspaces", In Proceedings of the ACM International Joint Conference on Pervasive and Ubiquitous Computing, Sep. 8, 2013, pp. 63-72.
Smith, Randall B., "Experiences with the Alternate Reality Kit: An Example of the Tension between Literalism and Magic", In Journal of IEEE Computer Graphics and Applications, vol. 7, Issue 9, Sep. 1987, pp. 42-50.
Stefik, et al., "WYSIWIS Revised: Early Experiences with Multiuser Interfaces", In Journal of ACM Transactions on Information Systems (TOIS), vol. 5, Issue 2, Apr. 1987, pp. 147-167.
Stewart, et al., "Single Display Groupware: A Model for Co-Present Collaboration", In Proceedings of the SIGCHI Conference on Human Factors in Computing Systems, May 15, 1999, pp. 286-293.
Swan, et al., "Making Place for Clutter and other Ideas of Home", In Journal of ACM Transactions on Computer-Human Interaction (TOCHI), vol. 15, Issue 2, Jul. 2008, 24 Pages.
Tashman, et al., "LiquidText: A Flexible, Multitouch Environment to Support Active Reading", In Proceedings of the SIGCHI Conference on Human Factors in Computing Systems, May 7, 2011, pp. 3285-3294.
Voida, et al., "It Feels Better Than Filing": Everyday Work Experiences in an Activity-Based Computing System, In Proceedings of the SIGCHI Conference on Human Factors in Computing Systems, Apr. 4, 2009, pp. 259-268.
Walny, Jagoda Katarzyna., "Thinking with Sketches: Leveraging Everyday Use of Visuals for Information Visualization", In Thesis Submitted to the Faculty of Graduate Studies in Partial Fulfillment of the Requirements for the Degree of Doctor of Philosophy, Dec. 2016, 58 Pages.
Xia, et al., "WritLarge: Ink Unleashed by Unified Scope, Action, & Zoom", In Proceedings of the CHI Conference on Human Factors in Computing Systems, May 6, 2017, pp. 3227-3240.

* cited by examiner

Scenario 1: Main Interface + Folio Creation
 1) Taskbar sits next to the Start button of the operating system
 2) Create a folio by typing a name and selecting a color scheme for a style
 3) A new folio (a shared portal for mixed media and tools) now displayed on top of the desktop and can share Applets across devices.

Scenario 2: Collecting Images While On The Go
 1) The folio synchronizes the container and its contents between Alice's tablet and the desktop of her computer at work.

Scenario 3: Creating and Fulfilling an Image Promise
 1) Alice drops an empty image applet into a document, and shares it with John;
 2) John fulfills the images by taking a photo and returns it to Alice;
 3) Alice retrieves the image and the document auto-updates.

Scenario 4: Sharing Contents on a Large Display
 1) During the meeting, Alice and Gabe can work on the large display via telepointer applets.
 2) John takes notes and extracts copies of the document.

FIG. 6C

METHOD FOR SHARING CONTENT AND TOOLS INDEPENDENTLY FROM DEVICES, APPLICATIONS, USERS, AND TIMES

BACKGROUND

Collaborative work using multiple devices over a network has become commonplace. A user or users may utilize multiple devices, a laptop computer and a tablet for example, to accomplish a task. Accordingly, modern information technology increasingly relies on multi-device workflows and distributed workplaces. However, existing collaborative solutions are often tied to a particular application, such as a browser or productivity applications. When a user utilizes multiple computing devices to accomplish a task, the user may need to become familiar with applications with user interfaces that are distinct among the respective computing devices.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

According to the present disclosure, the above and other issues are resolved by using a folio, which is automatically shared among users and among computing devices. A folio leverages a cloud-based infrastructure that provides failure-resilient synchronization using transaction logs. The infrastructure may automatically synchronize folios across devices as a cross-device fail-over. Content and tools within the folio are automatically shared across users and devices as the folio synchronizes with other folios. In an example, a multi-window operating system may present a folio as a top-level, semi-transparent UI element. The folio is an independent entity that is not tied to or solely associated with specific applications or resources that may be resident on the devices.

Systems and methods of sharing content and tools can comprise receiving an update to a media primitive in a first folio on a first computing device. In the example, the first folio comprises the media primitive, which includes content. The received update may relates to an addition to or modification of the content associated with the media primitive on a computing device. Upon receiving the update a notification is provided. The notification relates to synchronizing the media primitive in the first folio with a second folio resident on a second computing device. The first and the second computing devices may be identical in some aspects and distinct in some other aspects. The data migration between the first computing device and the second computing device during the synchronization of folios is performed using a peer-to-peer, cross device fail-over processing between the first computing device and the second computing device. Unlike data transfer based on a TCP-connection, in aspects, the synchronization of folio relies on a distributed client-server architecture where the server uses a transaction log and a central storage (e.g., a cloud storage) to manage shared states in local cache storages in respective clients.

In aspects, a data distributor on a cloud server receives the notification from the first computing device. The data distributer provides transactional logs for the cross-device fail-over among client devices for synchronizing folios and their constituents.

In aspects, constituents of a folio includes media primitives and tools for synchronous sharing of content and/or asynchronous updating of content. For example, an interaction promise provides asynchronous update of content of a media primitive by replacing a placeholder data in a media primitive of a folio with the later received content. The placeholder refers to a location within a resource, such as a document, a presentation, a multimedia file, or any other type of electronic resource.

In further aspects, the folio is operable to share tools across devices, such as telepointers, cameras, or other types of interfaces or access to local applications, thereby allowing a remote user to access and/or modify content on a remote device via the folio without requiring the user to establish a remote desktop session.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

FIG. 6C illustrates examples of usage scenarios in accordance with aspects of the present disclosure.

DETAILED DESCRIPTION

Figure 1:
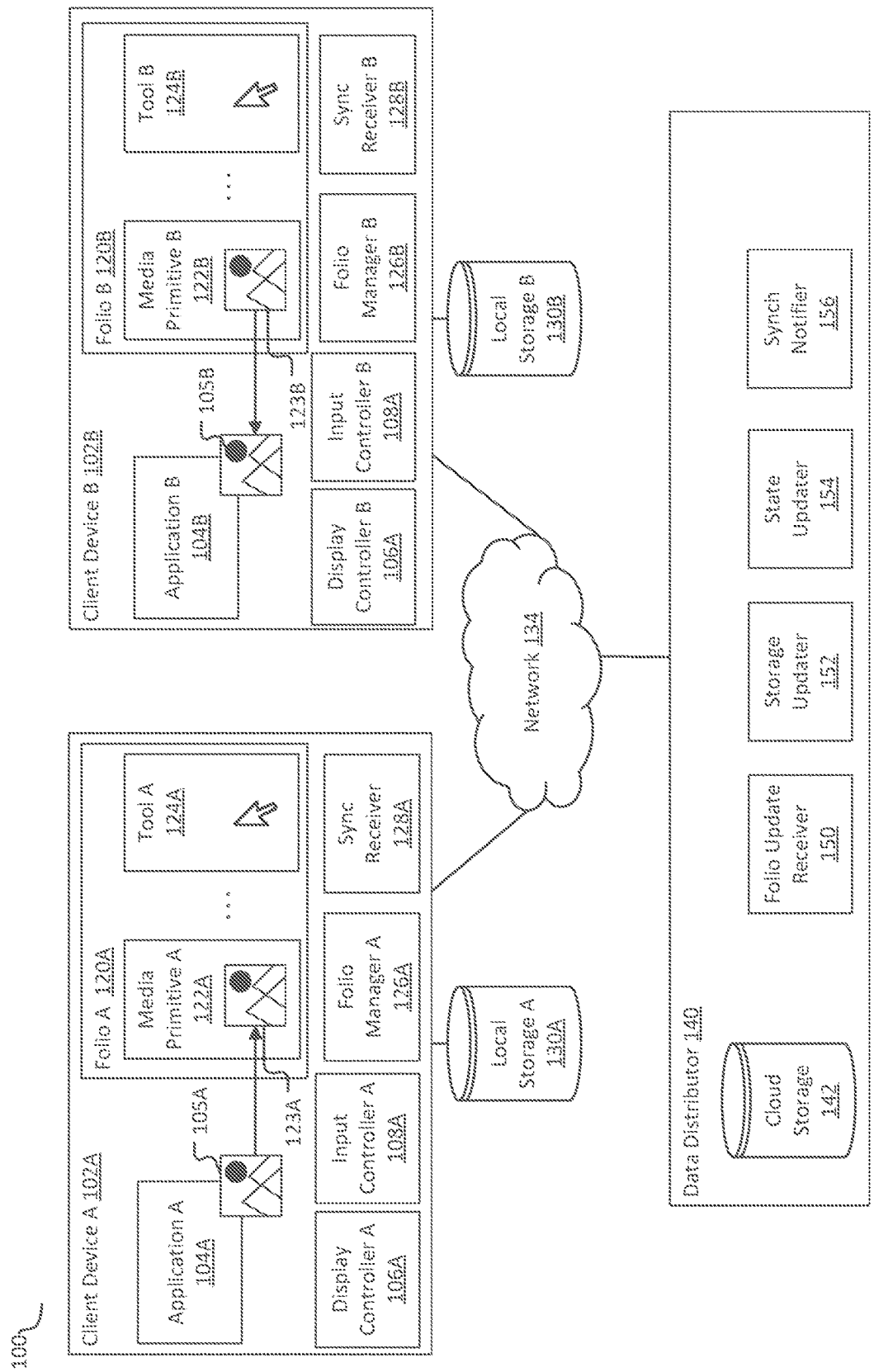
FIG. 1 illustrates an overview of an example system for interactively sharing content among users and devices in accordance to aspects of the present disclosure.

Various aspects of the disclosure are described more fully below with reference to the accompanying drawings, which from a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

Modern information technology increasingly relies on multi-device workflows and distributed workspaces. The multi-device workflows performed by a single user leverage from an ecosystem of technologies that transition a task from one device to another while the single user performs the task. The collaborative work is benefited by an ecosystem of technologies that transition user activity from one place to another. As used herein, the term "place" may be a literal location, a different device or device form-factor, a space where collaborators are in proximity, or the location and/or availability of information needed to complete a particular task. The term "place" may also be a virtual location where multiple users at respectively remote locations may be virtually collocated. But the problem is that—if we consider place in such a general manner—these transitions come at a high cost, in the currencies of both application development and user experience.

The present disclosure benefits modern information technology by allowing collaboration between devices and parties without relying upon a particular application or device. Rather aspects of the present disclosure allow for the transition of user activities from one device to another in a manner that allows interactions to be unbound from devices, applications, users, and time by leveraging the disclosed folio. In aspects, a cross-device fail-over provides a series of operational steps to resiliently transition an update of a folio and its constituents on one computing device to another folio on another computing device. The folio may be rendered as a top-level interactive window above application windows. Additionally or alternatively, the folio provides access to remote or local resources and tools which may be owned by different users and reside on different devices (or client devices). The devices are connected based on a resilient, distributed systems foundation.

Allowing for collaboration among multiple users across multiple devices presents a number of complex problems.

Collaborators may be collocated or distributed. Operations may depend upon device, application, user, and time constraints. Network, software, and hardware failures or temporary outages mean that complex partial failure conditions. The complex partial failure condition may cause issues for programmers and end-users to anticipate and process correctly. The complex partial failure condition may occur at any moment in time at any device. Prior solutions address these problems by limiting the collaboration to a single application or type of device. However, in doing so, the individual collaborators have the burden of learning how to operate potentially unfamiliar devices and/or applications. Even if the collaborator has familiarity with the particular device or application, the collaboration solution may prohibit them from using her preferred device or application. Further, the specific collaboration applications or devices may require users to have previously register themselves before allowing them to participate in a collaboration. These burdens result in reduced productivity overall in collaborative or multi-device workspaces.

As noted above, existing collaboration solutions are in "siloed" (in a single device or application, such as a browser)—and rely upon folder synchronization, or the sharing entire files. In contrast, aspects of the present disclosure provide an integrative solution which addresses the above problems by providing an intuitive user interface (UI) that can be accessed by different collaborators across different devices. Existing collaboration solutions, which rely upon document-centric archives providing cloud storage of entire documents and the synchronization of established folders and files. Aspects disclosed herein, however, utilize transient pieces of content (or tools) in active use by multiple collaborators. Some other existing systems rely on messaging to provide collaboration, such that files or images are dragged into threads to be shared. But these systems still result in silos: one must switch to a specific sharing application to share the content and often, there is no way to share tools. Similarly, a user may use the sharing application in multiple devices to perform a task. That is, the user may use the "sharing application" to share content with oneself on other devices. The single-user, multiple-device usage of the sharing application would not be expected by users. It would be counter-intuitive trying to call oneself on a telephone using another telephone, for example.

The present disclosure addresses the issues above through the use of folios, which allow collaborative operations to be agnostic of devices, applications, users, and/or time. In aspects, Applets are light-weight, distributed user interface elements that reside at the top level of an operations system or application which allow for a uniform UI environment. The disclosed folios with respective constituents may be rendered as a top-level interactive window above application windows as controlled by the window manager of a multi-window operating system. Accordingly, shared content and tools are always available to a user, even as the user switches between their familiar productivity applications, documents, or web pages.

The present disclosure further addresses the issues of managing a complex task of forming and updating a team of collaborators with respectivedevices. The aspects disclosed herein may provide for the automatic formation of a group of collaborators. The present disclosure further addresses the issues of managing a complex task of adding and removing one or more devices from a set of multiple devices that an individual may utilize. In some aspects devices that are physically or virtually in proximity may form a federation where content and tools may be automatically synchronized for sharing among the devices. Forming a federation of devices in physical proximity may be based on data from proximity sensors of respective devices. Forming a federation of devices in virtual proximity may be based on a predefined group of devices or an automatic formation of a group based on semantic or contextual relationship among the devices, for example. In some other aspects, a set of devices for forming the confederation may be registered by the server (i.e. the data distributor) by transmitting a request by respective devices.

Conventional collaboration systems focus on sharing documents. Aspects of the present disclosure provides sharing contents that constitute documents. The present disclosure also focuses on supporting collaborative work and an individual's work, which act upon pieces of content across multiple devices. The collaborative work may be a combination of distributed user operations, interactive tools, inputs, content, and behaviors, for example. The individual's work may be utilizing a combination of multiple devices while moving the pieces of content across the device with a variety of user operations, interactive tools, inputs, for example. In aspects, interactive tools and inputs include, for example, a clipboard, a color picker, a camera stream, or a mouse telepointer.

Individual pieces of content may include, for example, images, passages of text, or color palettes that can be dragged and dropped into documents. But even groupings of multiple objects—for example, placeholders for three images—can be collected in a Container, which visually resembles a splayed-out sheaf of papers.

A folio is a distributed-interface object that carries instances of mixtures of media, of various sizes and types, and their tools of the trade. Any object—content, tools, or containers—can be shared across one's own devices (or with a collaborator's device(s)) via a folio. Additionally or alternatively, a folio may be a portal which allows for the access of applications, data, tools, and content in media primitives or other types of containers across different users and across different devices. In further embodiments, folio may be a UI construct that allows for interactively sharing of tools and media content across devices. The folio allows users, whether during individual's work or during collaborative work, to transition activities and controls from one device to another when interacting with the folio. Content, containers, and folios are all reified in the UI through Applets—draggable, semi-transparent UI elements that remain always-on-top of the window manager, available as the user switches between different programs or web pages. Finally, interaction promise acts as a reference to future content, such as a placeholder for data to be fulfilled (e.g., an on-site photo that has not yet been taken). The placeholder and the data to be fulfilled are encapsulated as cross-device media primitives and tools that users can likewise collect, share, and drag & drop or otherwise insert into documents. Sharing data with collaborators requires a different interface than passing individual work to one's own devices. By rendering a folio and its constituents as a top-level window above windows of applications, the present disclosure keeps the same sharing affordances always available, even as the user switches between their familiar productivity applications, documents, web pages, device types, and operating systems of the devices.

The present disclosure relates to systems and methods for transitioning user activity upon content and/or data from one device to another. A unified user interactive interface in the present system decouples user interface elements and operations from devices, applications, users, and times. The present system may comprise a resilient distributed systems foundation. In aspects, the cross-device fail-over provides a series of operational steps to resiliently transition an update of a folio and its constituents on one computing device to another computing device. The foundation provides interconnections for local applications and devices and shared resources under a hierarchical structure.

FIG. 1 illustrates an overview of an example system 100 for interactively sharing content among users and devices in accordance with aspects of the present disclosure. System 100 may represent a system for interactively sharing content or tools among users across devices. System 100 may distribute and synchronize program code and data among the connected devices.

Client device A 102A and client device B 102B represent distinct client devices. The respective client devices provide respective users of the devices with an environment capable of sharing content for a collaborative work. The respective devices connect to a distributed network, such as, for example, a cloud computing environment, over a network 134. Application A 104A is an application program for processing content, such as image data 105A for example, on client device A 102A. Application B 104B is an application program for processing content, image data 105B for example, on client device 102B. Application A 104A and Application B 104B may be the same or different applications.

Folio A 120A and folio B 120B execute on client device A 102A and client device B 102B respectively. In aspects, a folio is a program code that provides user semi-transparent interactive icons and dialog windows that are displayed on top of other windows on respective client devices. Folio A 120A and folio B 120B may contain one or more media primitives and tools. Folios may be displayed when needed by the users (e.g., when a mouse hovers at a folio icon) and then faded into background when not in use. In aspects, folio A 120A and folio B 120B are shared folios that are automatically synchronized. Updates made on one folio and its constituents (e.g., content of a media primitive in a folio) are automatically shared with the other folio. Thus, a folio is a salient way to unbind sharing of content and tools from users and devices.

Media primitive A 122A and media primitive B 122B comprises content. Content may be of one of a variety of types. Types of content in a media primitive may include but not limited to an image, a text, a sound for example. In aspects, a media primitive may be displayed when needed by the users (e.g., when a mouse hovers at a folio icon) and then faded into background when not in use. This way, the media primitive may represent a piece of content that is at hand for use in a moment as a reminder for sharing. A media primitive may also be a placeholder (e.g., a generic empty image) of content to be fulfilled at a later time. Image data 105A that has been processed (e.g., created and/or edited) by Application A 104A may be copied to media primitive A 122A, for example. The directed arrow from image data 105A to image data 122A represents the copy operation. Accordingly media primitive A 122A includes image data 123A, which is a copy of image data 105A. In further aspects, the disclosed media primitives may represent an application, a graphical interface element, a tool, or any type of data structure or computer resource. One of skill in the art will appreciate that the synchronization benefits described herein can be utilized to share any type of computer resource across devices. In aspects, the synchronization may include updating the digital asset rights of digital rights management on image data 123A and the copy of image data 105A as digital assets, for example.

In some aspects, a media primitive may be linked to a short-term storage in a device used for transferring data within and between applications. Input may be from a file system, an application, and from input devices, for example. The short-term storage may store various types of content, text, sound, and image data, for example. In aspects, adding (e.g., copying in) or removing (e.g., deleting) content on the short-term storage updates the media primitive.

The media primitive is in a folio that is shared across users and devices. Users of other devices may transfer data from the media primitive to local applications of respective devices. In effect, the short-term storage on a device may be automatically shared with others users across devices by the synchronized folio. As should be appreciated, a folio according to the present disclosure provides automatic sharing of its content (e.g., media primitives and tools within the folio) among users across devices. User interactions for sharing the data is therefore agnostic to users, devices, and applications.

Tool A 124A represents one of various types of tools in folio A 120A in client device A 102A. Tool B 124B represents one of various types of tools in folio B 120B in client device B 102B. Tool B 124B is a shared tool of Tool A 124A as folio B 120B in client device B 102B is synchronized with folio A 120A in client device A 102A. A folio enables automatic sharing and synchronizing the tools among users across devices. By placing tools in a folio, data being processed by the tools and functionalities provided by tools may be shared among users and among devices the tools are synchronized across the network. In aspects, types of tools may include but not limited to a color picker (i.e., a color transmission device that processes color as data). A tool may be a keyboard (e.g., processes key input as data), a mouse pointer (e.g., processes location data and input on a screen as data), and a camera (i.e., an image input device that processes image as data), a screen copier (e.g., processes a copy of at least a partial screen), a page extractor (e.g., extracts a copy of a page of a document), etc. A tool encapsulates one or more functionalities provided by the device hardware or application on the client device. Exemplary tools will be described in further detail below. While exemplary tools are disclosed herein, one of skill in the art will appreciate that any type of tool may be shared among collaborators without departing from the scope of this disclosure.

A camera tool enables collecting photos as one or more users using the camera tool in a shared folio take photos on respective client devices. The camera tool also enables sharing a desktop (e.g., a screen and a display) of a client device with other client devices. In aspects, the camera tool in a folio may be associated with a display controller of a client device. This way, a snapshot of the display image becomes accessible by the camera tool. The folio and the camera tool within the folio are automatically synchronized across the users and the client devices across the network. The screen is continuously shared across the users and the client devices as the snapshot of the display image in the display controller is periodically updated. The color picker enables users to share a color of a specific location of a screen of a device with other users and other devices. The color picker associated with a folio operates by reading a color information of the location. Then the color picker provides the color information as a user selects the color picker tool from the folio on the same or another device. A keyboard tool enables sharing keyboard input data with applications across devices. The keyboard tool associated with a folio receives a series of keyboard input at a first device. The keyboard tool then provides the series of the keyboard input data to another device when the keyboard tool is selected from the folder. A telepointer tool enables sharing a telepointer (e.g., mouse pointer) with other devices. A user creates a telepointer tool in a folio for sharing. Other users with accesses to the synchronized folio may open the telepointer tool in other devices. As the other users move respective mouse pointers, the telepointer tool captures a series of mouse cursor location data from the respective users in the respective devices and provides the series of mouse cursor location data from the other users on the screen. In aspects, the mouse pointer tool in a synchronized folio on another client device provides the series of mouser cursor location data to another client device for displaying a tele pointer.

Data distributor 140 automatically synchronizes folio A 120A in client device A 102A and folio B 120B in client device B 102B. Folio A 120A and folio B 120B are clones and share the same media primitives and tools. Accordingly, media primitive A 122A synchronizes with media primitive B 122B. Image data 123B is a copy of image data 123A as they are synchronized. Tool A 124A synchronizes with tool B 124B. In some aspects, an application or a piece of the application may be synchronized by use of tools in a folio. A piece of spreadsheet with an application to render the piece of spreadsheet may be assigned to a tool. This way, the piece of spreadsheet may be rendered and operated upon by a user on a different device with the application when the tool is synchronized across the devices. The devices that lack a location application to process the piece of spreadsheet may still render the piece of spreadsheet on the device because of the synchronized tool. In aspects, image data 123B, which is a clone of image data 123A, may be copied to image data 105B in Application B. In some other aspects, application B 104B may directly access and process image data 123B in media primitive B 122B without copying or transferring (or importing) image data 123B to image data 105B for processing. The directed arrow from image data 122B to image data 105B represents the copy operation. Application B may further process (e.g., edit) image data 105B.

Folio manager A 126A and folio manager B 126B respectively notify data distributor 140 when folios in respective client devices are updated. When media primitive A 122A is updated as image data 123A is copied from image data 105A in Application A 104A, folio A 120 A is updated. Folio manager A 126A transmits a notification to folio update receiver 150 in data distributor 140 (a cloud server) over the network 134.

Sync receiver A 128A and sync receiver B 128B respectively receive sync notifications from data distributor 140. Upon receiving a sync notification, sync receiver A 128A and sync receiver B 128B may receive media primitives and tools that have been updated in other devices and synchronize data within respective folios. In aspects, sync receiver A 128A and sync receiver B 128B receive sync notification from sync notifier 156 in data distributor 140. In some other aspects, sync receiver B 128B updates image data 123B in media primitive B 122B in client device B 102A with image data 122A when image data 122A in media primitive A in folio A 120A in client device A 102A is updated.

Display controller A 106A and display controller B 106B respectively control displays of client device A 102A and client device B 102B. Display controller B 106B controls a display of client device B 102B. In aspects, assigning a display controller to a camera tool in a media primitive in a folder may enable screen sharing among users.

Input receiver A 108A and input receiver B 108B respectively receiver mouse and/or keyboard input data in respective client device A 102A and client device B 102B. In aspects, generating a telepointer tool (e.g., tool A 124A) in folio A 120A associates the telepointer tool with input receiver A 108A. This way, the telepointer tool (tool A 124A) receives a series of input data for sharing with a telepointer tool (e.g., tool B 124B) in client device B 102B.

In aspects, a container (not shown in FIG. 1) is a collection of media primitives. The container may specify a layout of displaying the collection of media primitives. The layout may be vertical tiles, horizontal tiles, and fanning, for example. A folio may include containers for sharing collections of media primitives among users across devices.

Local storage A 130A and local storage B 130B respectively store data locally in client device A 102A and client device B 102B. In aspects, the locally stored data may include locally cached data for a folio and data associated with media primitives and tools within the folio. Use of the locally cached data instead of relying upon receiving data from cloud storage 142 over the network 134, for example, reduces response time of user interactions at respective client devices. In some other aspects, the locally cashed data may be controlled by data distributor 140 to attain consistency with centrally stored data in cloud storage 142 in data distributor 140.

Data distributor 140 distributes data and program code, which relate to folios and respective constituents across devices (e.g., client device A 102A and client device B 102B) over the network 134. In aspects data distributor 140 maintains transaction records of updating the folios and respective constituents. When a client device fails in synchronizing data, data distributor 140 provide instructions to the client device to roll back the transaction and restore a previous state of the folios or re-execute the synchronization operations based on the transaction records to restore the shared folios.

Data distributor 140 may include a cloud storage 142, folio update receiver 150, storage updater 52, state updater 154, and sync notifier 156. Cloud storage 142 stores data that relate to folios, media primitives, and tools, for synchronizing among client devices. Cloud storage 142 may store transaction records and logs to manage steps of synchronizing data. Data distributor 140 may use the data in cloud storage 142 to enable client devices to roll-back and recommit to attain synchronization when the client device experience an issue in synchronizing data.

Folio update receiver 150 receives folio update notifications from respective clients, client device A 102A and client device B 102B, for example. In aspects, a folio update notification includes an identifier of a client device, data that relate to a folio that has been updated in local operations in the client device. Folio update receiver 150 may receive updated data for media primitives and tools in the folio.

Storage updater 152 updates data in cloud storage 142 with received data that relate to the updated folio. In aspects, storage updater 152 may generate and store transaction records and logs of the folio. Maintaining the transaction records and logs enables data distributor 140 to instruct client devices that suffer an error in synchronizing data to roll back and recommit operations for synchronizing folios and respective constituents.

State updater 154 updates state information with respect to the synchronizing folios across multiple users over multiple devices. State updater 154 may update states in conjunction with storage updater 152 that updates cloud storage 142. In aspects, a state may be one of the following states for synchronization: received an update notice, sent update notifications to client devices, received one or more confirmation for receipt of the update notice from client devices, and received one or more confirmations from the client devices for completing synchronization of the folios.

Sync notifier 156 notifies and instructs respective client devices to synchronize folios and respective constituents based on data that relates to updating the folios in the cloud storage 142. In aspects, a notification to synchronize folios may include identifiers and content of the folios that need to be synchronized. In some aspects, the notification may include a series of instructions with transaction records to enable client devices to roll-back and reconstruct the data updates when the client devices experience an error and/or loses folio data.

As should be appreciated, the various methods, devices, applications, features, etc., described with respect to FIG. 1 are not intended to limit the system 100 to being performed by the particular applications and features described. Accordingly, additional controller configurations may be used to practice the methods and systems herein and/or features and applications described may be excluded without departing from the methods and systems disclosed herein.

Figure 2A:
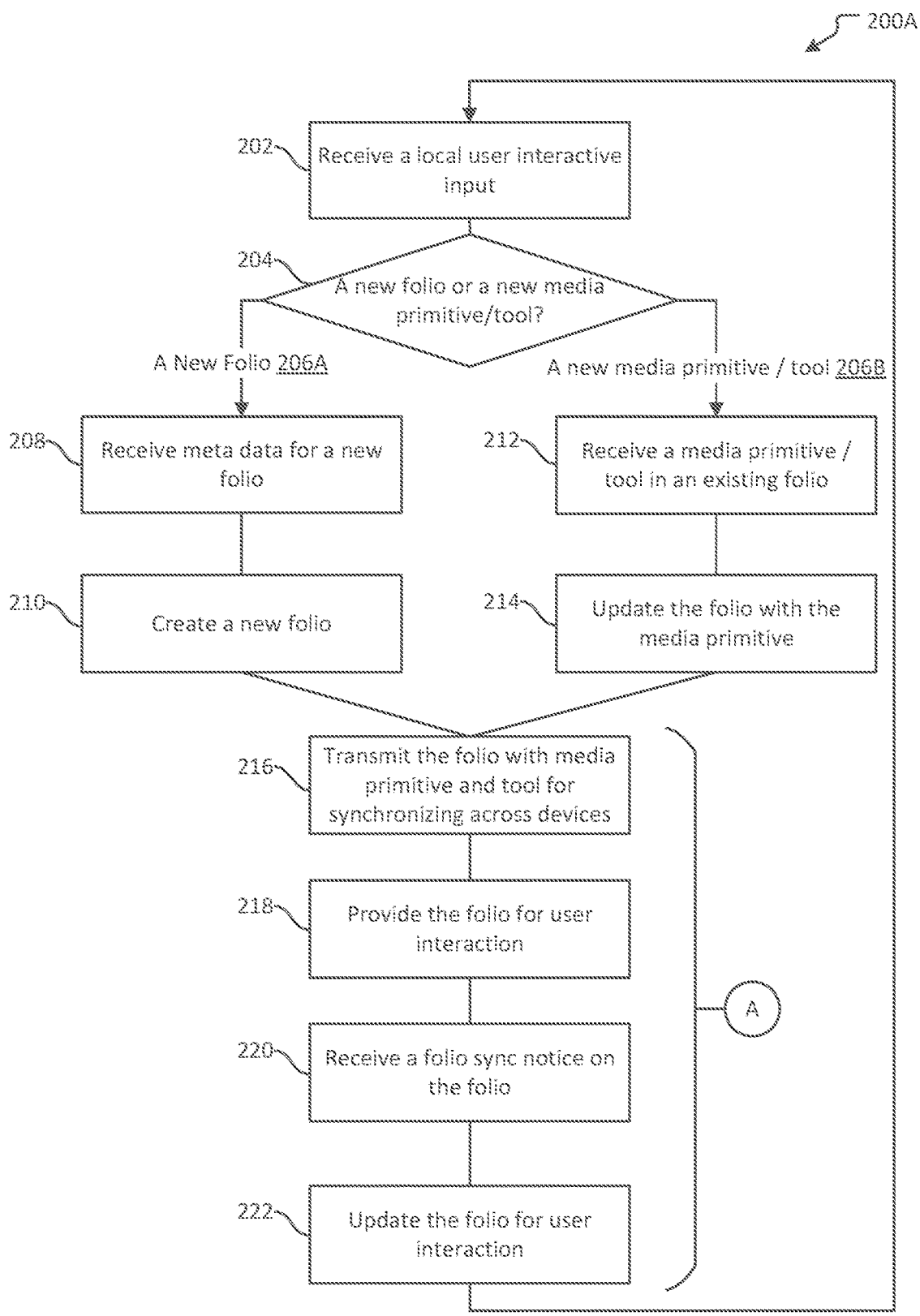
FIG. 2A illustrates an example method of interactively generating a folio and its constituent in accordance with aspects of the present disclosure.

FIG. 2A illustrates an example method 200, as performed by a client device, for interactively generating a folio for sharing content among users and devices in accordance with aspects of the present disclosure. A general order of the operations for the method 200A is shown in FIG. 2A. Generally, the method 200A begins with receive operation 202 and takes recurring operations after update operation 222. The method 200A may include more or fewer steps or may arrange the order of the steps differently than those shown in FIG. 2A. The method 200A can be executed as a set of computer-executable instructions executed by a computer system and encoded or stored on a computer readable medium. Further, the method 200A can be performed by gates or circuits associated with a processor, an ASIC, an FPGA, a SOC or other hardware device. Hereinafter, the method 200A shall be explained with reference to the systems, components, devices, modules, software, data structures, data characteristic representations, signaling diagrams, methods, etc., described in conjunction with FIGS. 1, 2B-C, 3, 4A-C, 5A-B, 6A-D, 7, and 8A-B.

Receive operation 202 receives a local user interactive input on a client device (e.g., client device A 102A in FIG. 1). The local interactive input may include an instruction by a user of the client device to create a new folio, a new media primitive in an existing folio, or a new tool in the existing folio. In aspects, the local user interactive input may be in a form of a menu selection that specifies the instruction.

Comparison operation 204 compares whether the received local interactive input is for creating a new folio or a new media primitive/tool. When the input is for creating a new folio 206A, receive operation 208 interactively receives metadata for a new folio. The metadata for the new folio may include, but is not limited to, a name, a style of an icon, a typesetting used for rendering, of the new folio. The style of the new folio may include one or more colors used to represent the new folio as an icon. In aspects, metadata of a folio and its constituents, may specify how to determine recipients (e.g., based on proximity or by pre-registered access control list by data distributor, for example).

Create operation 210 creates a new folio based on the received metadata and displays the new folio with the style. In aspects, create operation 210 may allocate a memory in the local storage of the client device and store metadata about the new folio in the allocated memory. In some aspects, the client device may create one or more constituents (e.g., a media primitive and a tool) for the new folio when the new folio is created. In some other aspects, one or more constituents of a folio, a media primitive and/or a tool may be created before creating a folio on the client device. Accordingly, one or more existing media primitives and/or tools may be added to a folio at the time the folio is created. After the folio is created, the steps proceed to transmit operation 216 of the new folio. When the received input specifies creating a new media primitive or a tool 206B, receive operation 212 interactively receives a media primitive or a tool without content in an existing folio. Update operation 214 updates the folio with the new media primitive or the new tool. In aspects, user may add content to the new media primitive interactively by dragging and dropping content (e.g., image and sound) from a local application (e.g., an image editor), a file directory, or user input (e.g., voice input). One of skill in the art will appreciate that any type of resource can be added to a new media primitive.

Operational steps 216 through 222 may be grouped (as indicated by (A) in FIG. 2A) as a series of steps to synchronize a folio. Transmit operation 216 transmits an update notice of the folio with media primitive and tool for synchronizing across users and multiple devices.

In some aspects, correlation of sensors and physical angular and/or linear motions of specific devices within a federation may trigger synchronization of folios across the devices. A user with a device in a federation of users or devices may place content or data in a primitive or a tool in a folio. Then, the user may tilt the device toward another user with a distinct device. The correlation of the tilt operation and proximity/relate position of the other user and possibly a tilt of the other user's device at the same time may trigger synchronizing the folio between the two devices or dynamically create a folio that is privately shared between the two users, for example. A similar creation of the shared folio may be provided among remote users as the remote users perform telepresence (e.g., with telepointers or other methods of rendering remote presence) and tilt their respective devices toward one another in the telepresence.

Transmit operation 216 transmits a notice of the created or updated folio. The notice may include metadata associated with the folio, metadata associated with media primitives and tools for synchronizing across devices, and content and data associated with the media primitives and tools respectively in the folio The transmission of the notice and the folio data is to data distributor 140, for example. In some aspects, the client device may receive a message from the data distributor in response to the transmission. The message may indicate a confirmation of the data distributor receiving the transmission about the updated folio. In some other aspects, the client device may receive an additional message from the data distributor. The additional message may indicate that the data distributor has notified a sync notice to other client devices and received from the other client devices to confirm that the folio has been synchronized in the respective client devices. In aspects, the client device may provide feedback to the user when one or more of other users and devices in the federation of client devices have received the updated folio with the media primitives and/or the tools through synchronization. The feedback may be based on visual feedback, audio feedback, and/or haptic feedback on the client device. The feedback may be provided on other devices, wearables or tablet, for example for giving awareness of the receipt. In some other aspects, the client device may provide feedback to the user when one or more of the other users and devices in the federation of client devices have not accessed the update folio with the media primitives and/or the tools through synchronization. The feedback on the lack of access may be based on a predetermining time period that has lapsed since the folio was updated on the client device, for example. In some other aspects, timing of providing the feedback to the user about a status of synchronization and/or access may be based on a location of the client device or any of the other client devices in the federation of client devices.

Provide operation 218 provides the folio for user interaction on the client device. In aspects, the client device may display the folio as a user interactive icon or a window with its name. User may interactively access content of the media primitive and/or use the tool. User may copy image data in the media primitive to a local application for editing the image data, for example. In some aspects, selecting a folio may cause displaying a menu for operating on the folio, listing its constituents, adding a media primitive and a tool, for example. In some other aspects, an icon that represents a folio may indicate one or more of its constituents in thumbnails images and colors. In yet some other aspects, existing media primitives and tools may be added to the folio by copy& paste and interactively dragging & dropping icons that correspond to the media primitives and tools onto the folio icon and window. Content may be added to a media primitive by various user interactive operations, copy & paste, drag & drop, for example.

Receive operation 220 receives a folio sync notice on the folio. In aspects, the folio sync notice may be received from a data distributor (e.g., data distributor 140 in FIG. 1) over the network. The folio sync notice may specify a folio to update with specific content. Update operation 222 updates the folio on the client device. In aspects, update operation 222 may update rendering that represents the folio to convey added constituents, media primitives and tools for example. After completing update operation 222, the steps proceeds to receive operation 202 to receive input through a local user interaction in the client device.

As should be appreciated, operations 202-222 are described for purposes of illustrating the present methods and systems and are not intended to limit the disclosure to a particular sequence of steps, e.g., steps may be performed in different order, an additional steps may be performed, and disclosed steps may be excluded without departing from the present disclosure.

Figure 2B:
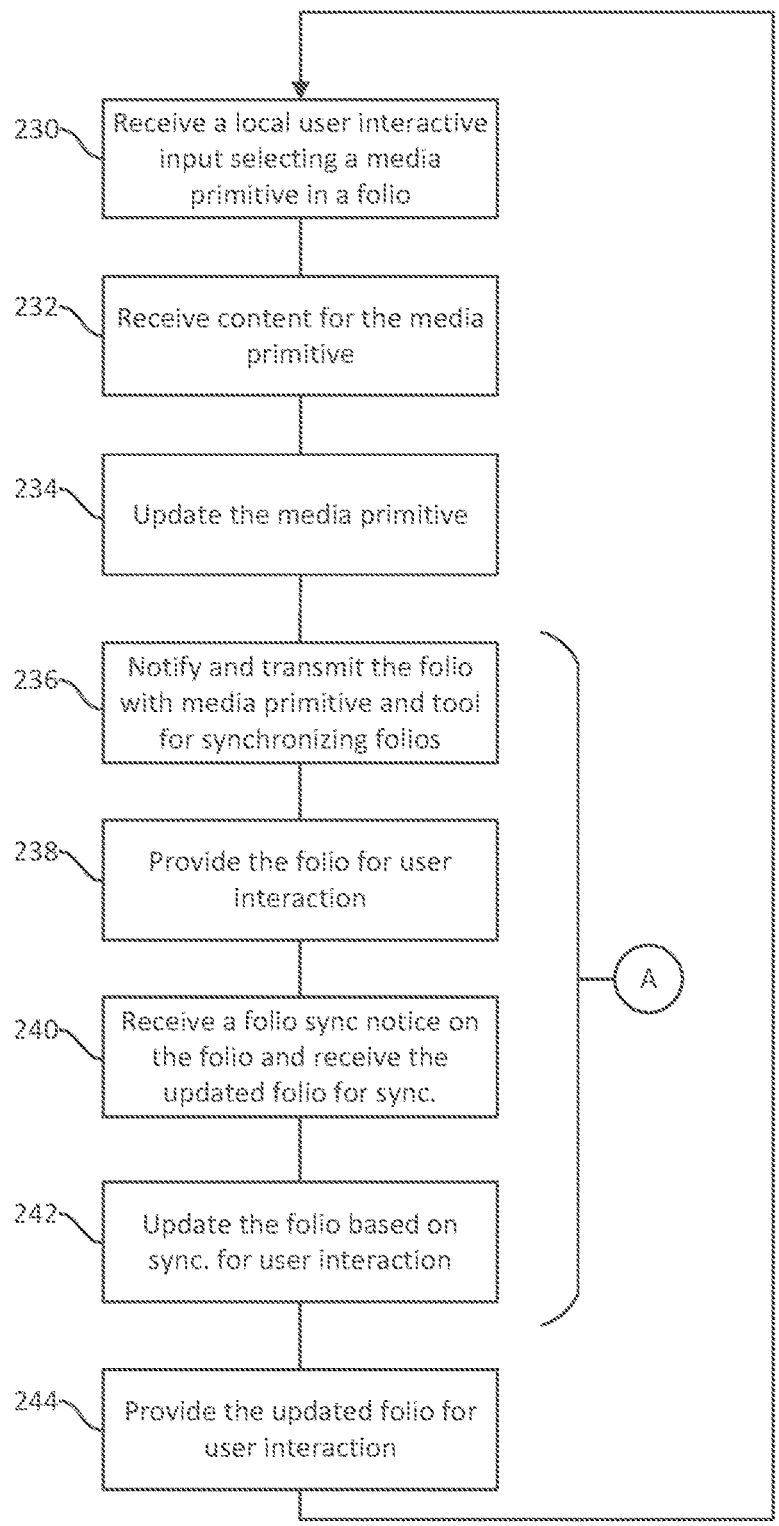
FIG. 2B illustrates an example method of interactively synchronizing a folio and its constituents in accordance with aspects of the present disclosure.

FIG. 2B illustrates an example method of interactively sharing content with other users through synchronizing folio across devices in accordance with aspects of the present disclosure. A general order of the operations for the method 200B is shown in FIG. 2B. Generally, the method 200B begins with receive operation 230 and takes recurring operations after update operation 242. The method 200B may be executed by data distributor (e.g., data distributor 140 in FIG. 1). The method 200B may include more or fewer steps or may arrange the order of the steps differently than those shown in FIG. 2B. The method 200B can be executed as a set of computer-executable instructions executed by a computer system and encoded or stored on a computer readable medium. Further, the method 200B can be performed by gates or circuits associated with a processor, an ASIC, an FPGA, a SOC or other hardware device. Hereinafter, the method 200B shall be explained with reference to the systems, components, devices, modules, software, data structures, data characteristic representations, signaling diagrams, methods, etc., described in conjunction with FIGS. 1, 2A, 2C, 3, 4A-C, 5A-B, 6A-D, 7, and 8A-B.

Receive operation 230 receives a local user interactive input at a client device. The interactive input selects a media primitive in a folio. In aspects, the folio may include more than one media primitives for selection. In some aspects the selected media primitive may be highlighted to indicate the selection. Receive operation 232 receives content for the media primitive. In aspects, the media primitive may be associated with a type of content. The type of content may be text, image, sound, for example. Receive operation 232 receives image data for the media primitive with image type, for example. Update operation 234 updates the media primitive with the received content. In aspects, a rendered representation of the media primitive may be updated to indicate the content in the media primitive. A thumbnail image of the image data may be displayed with the media primitive for the indication of the content, for example.

Transmit operation 236, by the client device to the data distributor, notifies about the updated folio and media primitive and transmits the folio metadata and data with media primitives and tools for synchronizing across devices. The transmission of the notice and the folio data is to data distributor 140, for example. In aspects, transmit operation 236 transmits metadata and data associated with the updated folio and its constituents. In some aspects, transmit operation 236 may transmit set of links (e.g., a location information in the local storage in the client device) that provides a location of locally-cached folio and its constituents. Data distributor may use the links to retrieve data and metadata of the updated folio and its constituents. In some aspects, the client device may receive a message from the data distributor in response to the transmission. The message may indicate a confirmation of the data distributor receiving the transmission about the updated folio. In some other aspects, the client device may receive an additional message from the data distributor. The additional message may indicate that the data distributor has notified a sync notice to other client devices and received from the other client devices to confirm that the folio has been synchronized in the respective client devices.

Provide operation 238 provides the folio for user interaction on the client device. In aspects, the client device may display the folio with its media primitive and/or tool, if any. User may interactively access content of the media primitive and/or use the tool. User may copy image data in the media primitive to a local application for editing the image data, for example. Receive operation 240 receives a folio sync notice on the folio. In aspects, the folio sync notice may be received from a data distributor (e.g., data distributor 140 in FIG. 1) over the network. The folio sync notice may specify a folio to update with specific content. Update operation 242 updates the folio on the client device. In aspects, update operation 242 may update rendering that represents the folio to convey added constituents, media primitives and tools for example. Provide operation 244 provides the updated folio on the client device for user interaction. After completing update operation 244, the steps proceeds to receive operation 230 to receive input through a local user interaction in the client device.

A set of operational steps 236 through 242 (as indicated by (A) in FIG. 2B) is at least similar to a series of steps of step 216 through step 222 synchronize a folio (as indicated by (A) in FIG. 2A). Transmit operation 236 transmits an update notice of the folio that includes media primitive and tool for synchronizing across users and devices.

As should be appreciated, operations 230-242 are described for purposes of illustrating the present methods and systems and are not intended to limit the disclosure to a particular sequence of steps, e.g., steps may be performed in different order, an additional steps may be performed, and disclosed steps may be excluded without departing from the present disclosure.

Figure 2C:
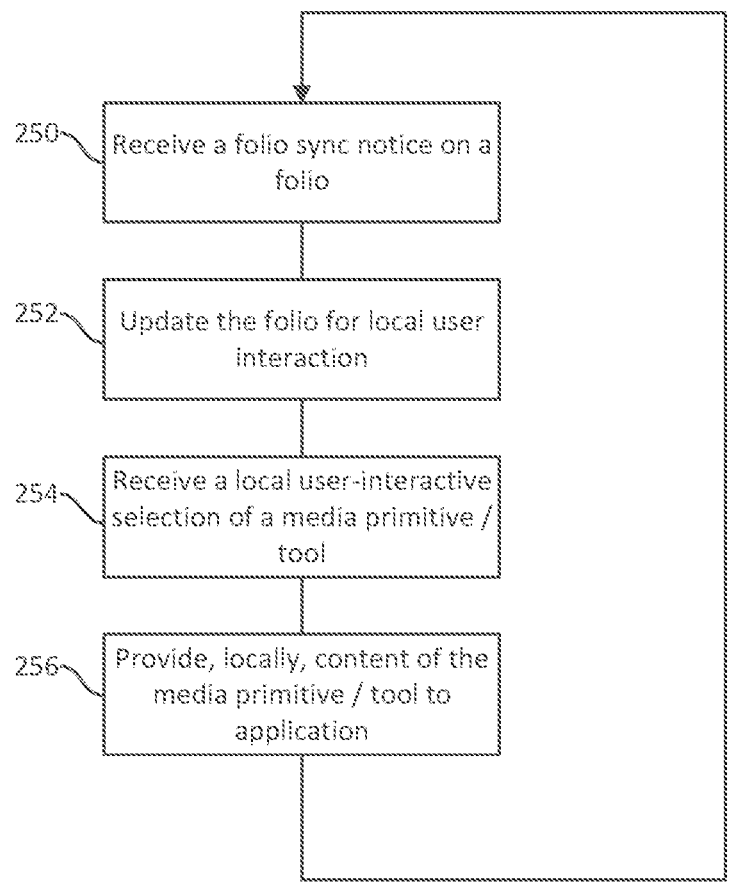
FIG. 2C illustrates an example method of interactively providing a synchronized folio and its constituent in accordance with aspects of the present disclosure.

FIG. 2C illustrates an example method, by the client device for example, of interactively sharing content among users and devices in accordance with aspects of the present disclosure. A general order of the operations for the method 200C is shown in FIG. 2C. Generally, the method 200C begins with receive operation 250 and takes recurring operations after update operation 260. The method 200C may include more or fewer steps or may arrange the order of the steps differently than those shown in FIG. 2C. The method 200C can be executed as a set of computer-executable instructions executed by a computer system and encoded or stored on a computer readable medium. Further, the method 200C can be performed by gates or circuits associated with a processor, an ASIC, an FPGA, a SOC or other hardware device. Hereinafter, the method 200C shall be explained with reference to the systems, components, devices, modules, software, data structures, data characteristic representations, signaling diagrams, methods, etc., described in conjunction with FIGS. 1, 2A-B, 3, 4A-C, 5A-B, 6A-D, 7, and 8A-B.

Receive operation 250 receives, by the client device for example, a folio sync notice on a folio in a computing device. In aspects, the folio sync notice includes data and metadata and data for updating constituents of the folio to be in sync with other corresponding folios across the users and the computing devices. In aspects, the client device receives data and metadata for an updated folio and its constituents. The client device may use the received data for locally updating the folio to synchronize with other folios. The constituents of the folio may include one or more media primitives and tools. The media primitives may include content, an image data for a media primitive with an image data type. The tools may include data associated with the tools, color data for a color picker tool, for example. In aspects, the client device may update data and metadata of the folio being stored in the local storage of the client device.

Update operation 252 updates the folio for local user interactions. In aspects, a thumbnail image of an image data in a media primitive may be displayed at the top level of the multi-window desktop display of the computing device, higher than application windows. The top level window may be semi-transparent, where the top level window fades when the top level window is not selected. This way, a shared content is conveniently visible to the user for selection as needed. In some other aspects, an icon for the color picker tool may be displayed with a particular color that represent the color data being shared. The color maybe yellow, for example.

Receive operation 254 interactively receive a user selection of a media primitive and/or a tool in the media primitive. In aspects, the image data in the media primitive in the folio may be selected upon receiving a selection input on the thumbnail image of the image data in the media primitive of the folio. In some other aspects, a tool may be selected. An icon of the color picker may be highlighted to indicate the selection upon receiving a user selection of a color picker tool for example.

Provide operation 256 provides the selected content of a media primitive or data of a tool to an application that is executed locally in the computing device. In aspects, provide operation 256 includes use of application programming interface (API) that is available in the computing device to programmatically transmit the content or the data from the folio to the application. The application may further process the received content or the data. In some aspects, provide operation 256 may provide the image data to a photo book application that is executed in the computing device for example. This way, the photo book application registers the shared image data to a photo album, for example. In some other aspects, the color data of yellow may be passed onto a color palette of a design illustrator application. The user may pick the color from the color palette in the design illustrator application to apply the shared color in creating an illustration. In some other aspects, provide operation 256 provides a link or a reference (e.g., a location information or address information) of the content or the data to one or more applications. The one or more applications may directly access the content or the data in the media primitive or the tool respectively in the folio. By directly accessing, the one or more applications may access the latest content or the data as the folio and its constituents are synchronized across the users and the client devices. The method 200C may return to receive operation 250 to enable further use of the shared content and data in the folio in the computing device.

As should be appreciated, operations 250-256 are described for purposes of illustrating the present methods and systems and are not intended to limit the disclosure to a particular sequence of steps, e.g., steps may be performed in different order, an additional steps may be performed, and disclosed steps may be excluded without departing from the present disclosure.

Figure 3:
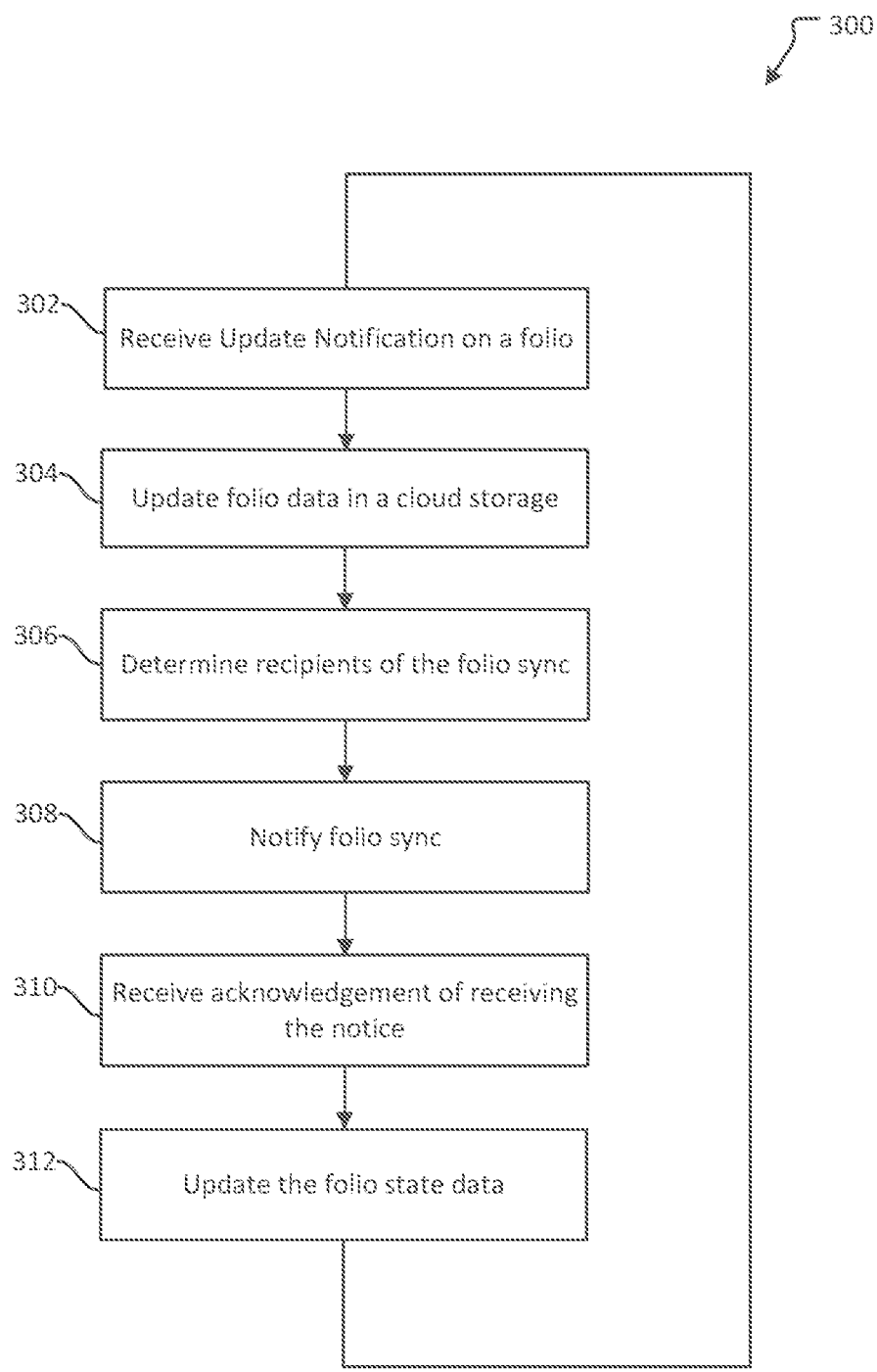
FIG. 3 illustrate an example method of synchronizing content according to aspects of the present disclosure.

FIG. 3 illustrate an example method of synchronizing content according to aspects of the present disclosure. A general order of the operations for the method 300 is shown in FIG. 3. Generally, the method 300 begins with receive operation 302 and takes recurring operations after update operation 312. The method 300 may include more or fewer steps or may arrange the order of the steps differently than those shown in FIG. 3. The method 300 can be executed as a set of computer-executable instructions executed by a computer system and encoded or stored on a computer readable medium. Further, the method 300 can be performed by gates or circuits associated with a processor, an ASIC, an FPGA, a SOC or other hardware device. Hereinafter, the method 300 shall be explained with reference to the systems, components, devices, modules, software, data structures, data characteristic representations, signaling diagrams, methods, etc., described in conjunction with FIGS. 1, 2A-C, 4, 5A-B, 6A-D, 7, 8A-B.

Receive operation 302 receives an update notification on a folio. In aspects, the update notification on the folio may be transmitted by a folio manager in a client device when the folio and its constituents, media primitives and tools for example, have been updated. The update notification may include an identifier of a folio being updated and requiring synchronization with folios in other client devices. The update notification may also include content data and metadata based on the updated folios.

Update operation 304 updates folio and its metadata in a cloud storage. The update operation 304 also stores details of changes being made to the folio. The stored data is sufficient for other client devices to synchronize the folios and its constituents.

Determine operation 306 determines recipients of the folio sync notifications. In aspects, data distributor 140 maintains connected client devices for automatically synchronizing folios and their constituents. In aspects, the recipients may be determined based on determining client devices that communicate in proximity of an originating client device that the update notification is received from. The client devices may comprise proximity sensors that detect other clients within a predetermined distance from respective client devices. In aspects, a proximity sensor may include but not limited to an infra-red (IR) sensor/emitter pair, an ultrasound sensor/emitter pair, depth cameras (e.g., motion sensing or light-radar (LIDAR) sensing modalities), an ultra-wideband (UWB) sensor/emitter, a sensor based on a signal strength cue from wireless, near field communication (NFC) (e.g., Bluetooth®) and low-power radio technologies. The low-power radio technologies may include triangulation from multiple sensor/emitter pairs across distribute devices, for example. In some other aspects, vision data received from an image input device, a web camera, for example, may be used as a proximity sensor. In some aspects, the received update notification of the folio may comprise a list of client devices that the proximity sensor of the originating client device has identified in its proximity. In some other aspects, a list of recipients of the folio sync notification may be pre-registered by one or more of client devices to the data distributor.

Notify operation 308 notifies client devices with a folio sync message. The folio sync message directs receiving client devices to synchronize specific folios and their constituents. The folio sync message includes metadata and content necessary to synchronize the folios and their constituents.

Receive operation 310 receives acknowledgement of receiving the notice at the client computing devices. In aspects, data distributor 140 maintains transaction statuses of respective client devices in synchronizing folios and their constituents. The received acknowledgment may be used by data distributor 140 to manage transactional statuses of respective client devices. In case of errors in synchronizing the folios and their constituents, data distributor 140 enables client devices to abort and redo the synchronization process and recommit upon a successful synchronization.

Update operation 312 updates the folio state data for synchronization based on the received acknowledgment and lack thereof. Upon completing the updating the folio state data, the operation proceeds to receive operation 302 to receive an update notification on a folio from a client device. The operation 310 forms a recurring steps.

As should be appreciated, operations 302-312 are described for purposes of illustrating the present methods and systems and are not intended to limit the disclosure to a particular sequence of steps, e.g., steps may be performed in different order, an additional steps may be performed, and disclosed steps may be excluded without departing from the present disclosure.

The present disclosure provides interaction promises. An interactive promise represents an asynchronous workflow where users can delegate pieces of content to other devices, or collaborators, for fulfillment in the future. Interaction promises use folios as proxies for the as-yet unavailable contents of a media primitive. Interaction promises may be fulfilled one or more times. In aspects, interaction promises for example, may be used to replace an initial image with a better option that a collaborator shares back later. Interaction promises support multiple fulfillment by using a set of media primitives as a placeholder for fulfilment at a later time. In aspects, the set of media primitives may be provided to an editor of a document as options of content for insertion to the document. By providing options to defer fulfilling specific content of a document enables editors of the document to gain efficiency and productivity by focusing on priority portions for editing without waiting for appropriate content. In some aspects, interaction promises enables a user to avoid waiting for co-workers to provide content while editing the document.

Figure 4A:
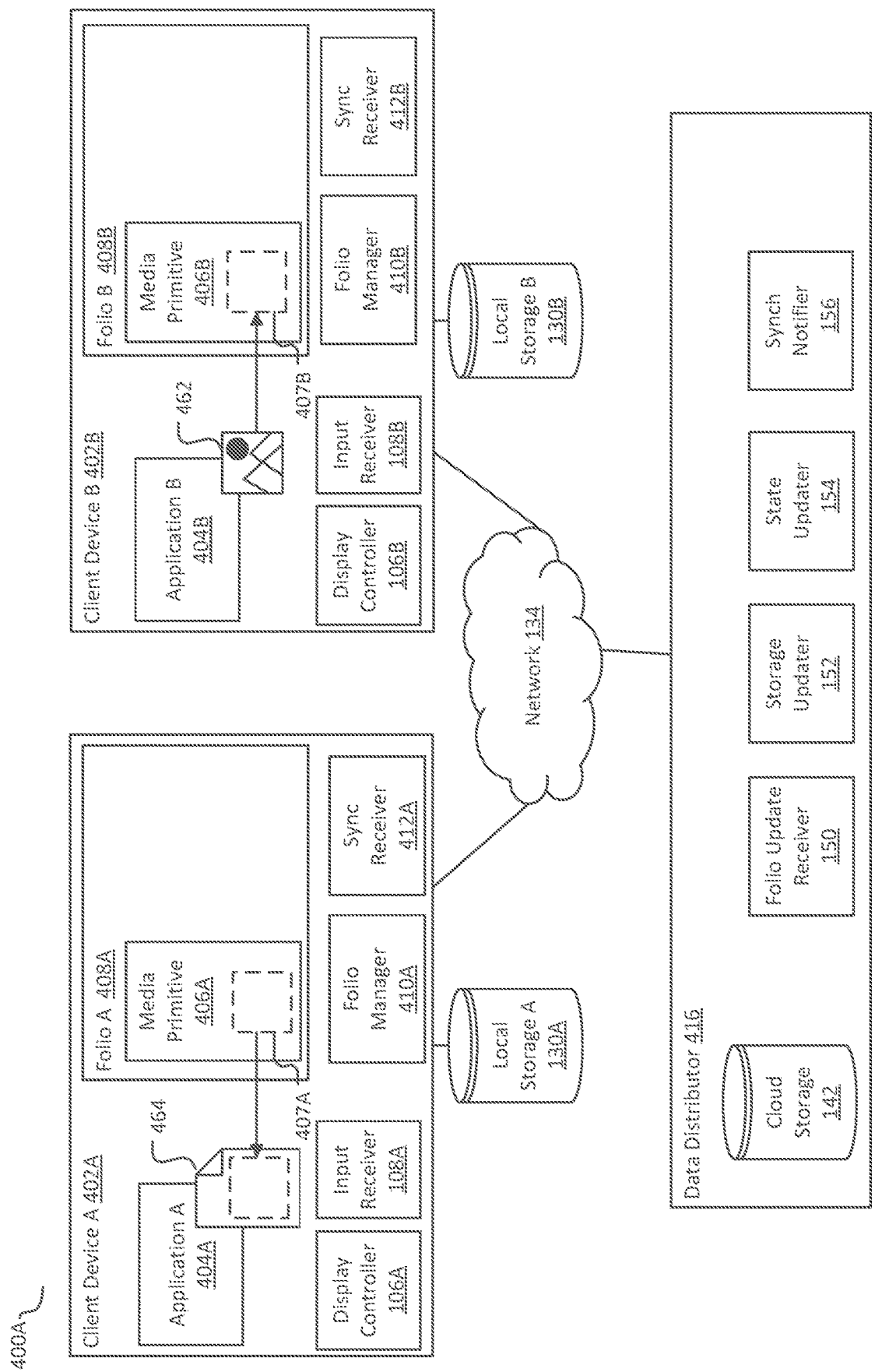
FIG. 4A illustrates an overview of an example system for automatically updating a document based on fulfilling a placeholder with content in accordance with aspects of the present disclosure.

FIG. 4A illustrates an overview of an example system for automatically updating a document based on fulfilling a placeholder with content in accordance to aspects of the present disclosure. In particular, the example relates to placing a placeholder of image data at a specific location in a document on a first client device used by a first user. The placeholder of the image data is linked to a media primitive of a folio in the first client device. The folio is automatically shared and synchronized to a folder for a second user using a second client device. At a later time, the second user copies an image data (e.g., a photo) from a local application (e.g., a photobook) to the media primitive on the shared folio on the second client device. The folders are synchronized again. The media primitive in the folio in the first client device receives the image data. The image data is then provided to the document and replaces the placeholder. In particular, system 400A depicts a state where document 464 in client device A 402A includes a placeholder that is linked to a placeholder 407A of media primitive 406A in folder A 408 of client device A 402A. Folio A 408A and folio B 408B are automatically synchronized. A user of client device B 402B is about to copy image data 462 to a placeholder 407B of media primitive 406B of folio B 408B. Based on the situation of the state, the present disclosure enables the image data 462 in client device B 402B to be copied and automatically inserted by replacing the placeholder in document 464 in client device A 402A. The user of client device B 402B may automatically insert image data 462 to document 464. The user associates the image data 462 with the placeholder 407B of media primitive 406B. In aspects, a drag & drop or copy & paste operation of the image data from application B to media primitive 406B establishes the association, for example.

Client device A 402A and client device B 402B represent the two client devices. The respective client devices provide respective users of the devices with environment to share contents for a collaborative work. The two client devices connect to the network 134. Application A 404A is an application program for processing document 464 on client device A 402A. Application B 404B is an application program for processing content, editing image data 462 for example, on client device B 402B.

Folio A 408A and folio B 408B are Applets on client device 402A and client device B 402B respectively. Folio A 408A and folio B 408B are shared folios and synchronized between client device A 402A and client device B 402B over data distributor 416.

Folio A 408A includes media primitive 406A. Media primitive 406A is shown as empty, without content. The lack of content is represented by the placeholder 407A. In the described example, the placeholder 407A is linked to a location data within the document 464. The specific location may be used to insert content of the media primitive 408A when the content becomes available. The location data may specify a coordinate that is 10.0 cm from a top edge and 2.5 cm from a left edge on page three of a document, for example. The media primitive may be of a type "image" with a dimension of 800 pixels horizontally by 800 pixels vertically, for example. The document may be stored in a file called "travel_doc." The file may associated with a specific application (e.g., Application A 404A) for editing the document. While specific types of content and file types are described herein, one of skill in the art will appreciate that the placeholder may be associated with any type of file type or data structure without departing from the scope of this disclosure.

Folio B 408B includes media primitive 406B. Folio A 408A and Folio B 408B are automatically synchronized by data distributor 416. In aspects, application B 404B is a photo book application that is executed in client device B 402B. In particular, the application B 404B may generate and edit image data 462.

In aspects, a user may copy the image data 462 to a placeholder 407B of media primitive 406B in folio B 408B. The copy operation may include a drag-and-drop operation, a copy-and-paste operation and other types of operations. After the image data 462 is copied to the placeholder 407B of media primitive 406B in folio B 408B, folio A 408A synchronizes with folio B 408B automatically by data distributor 416. Media primitive 406A in folio A 408A in client device 402A receives a copy of image data 462. Since the media primitive 406A links to the specific location in the document 464, content of the placeholder 407A in media primitive 406A is inserted at the specific location in the document 464. That is, a copy of image data 462 is automatically inserted at the specific location in document 464.

In aspects, the automatic insertion of the image data to the document in client device A 402A is agnostic to devices as the image data originates from client device 402B for insertion in the document in client device 402A. In aspects, the automatic insertion of the image data is unbound from devices, applications, users, and time.

The automatic insertion of the image data to the document is agnostic to users because distinct users use client device A 402A and client device B 402B according to this example. The automatic insertion of the image data to the document is agnostic to applications. The user of client device 402A may be familiar with use of application A 404A (e.g., a document editing application) and folio A 408A with media primitive 406A. The user of client device 402B may be familiar with use of application B 404B (e.g., a photobook application) and folio B 408B with media primitive 406B. The user of client device B 402B has no need to become familiar with application A 404A to insert the image data. The users only need to be knowledgeable about use of applications in the client device that respective users operate. The automatic insertion of the image data to the document is agnostic to time. The process of the automatic insertion does not impose time constraint between the time that the placeholder is created for the document in client device 402A and the time that the user of client device 402B selects and copies image data 462 to media primitive 406B.

The operations of synchronizing folio A 408A with the updated folio B 408B may be as follows. First, folio manager B 126B notifies the change in folio B 408B to data distributor 416. Folio update receiver 150 may receive the folio update notice from folio manager B 126B in client device B 402B.

Folio update receiver 150 receives folio update notifications from respective clients, client device A 402A and client device B 402B, for example. In aspects, a folio update notification includes an identifier of a client device, data that relate to a folio that has been updated in local operations in the client device.

Storage updater 152 updates data in cloud storage 142 with received data that relate to the updated folio. In aspects, storage updater 152 may generate and store transaction records and logs of the folio. Maintaining the transaction records and logs enables data distributor 140 to instruct client devices that suffer an error in synchronizing data to roll back and recommit operations for synchronizing folios and respective constituents.

State updater 154 updates state information with respect to the synchronizing folios across multiple users over multiple devices. State updater 154 may update states in conjunction with storage updater 152 that updates cloud storage 142. In aspects, a state may be one of the following states for synchronization: received an update notice, sent update notifications to client devices, received one or more confirmation for receipt of the update notice from client devices, and received one or more confirmations from the client devices for completing synchronization of the folios.

Sync notifier 156 notifies and instructs respective client devices to synchronize folios and respective constituents based on data that relates to updating the folios in the cloud storage 142. In aspects, a notification to synchronize folios may include identifiers and content of the folios that need to be synchronized. In some aspects, the notification may include a series of instructions with transaction records to enable client devices to roll-back and reconstruct the data updates when the client devices experience an error and lose folio data. In aspects, sync notifier 156 notifies client device A 402A to synchronize folio A 408A with folio B 408B In some aspects, the user of client device B 402B may, at a later time, update the image data in media primitive 406B. According to the present disclosure, the change in the media primitive triggers a series of steps for synchronizing folio A 408A with the updated folio 408B. As a result, the image data in document 464 in client device A 402A may be automatically replaced by the updated image data. In some other aspects, As should be appreciated, the various methods, devices, applications, features, etc., described with respect to FIG. 4A are not intended to limit the system 400A to being performed by the particular applications and features described. Accordingly, additional controller configurations may be used to practice the methods and systems herein and/or features and applications described may be excluded without departing from the methods and systems disclosed herein.

Figure 4B:
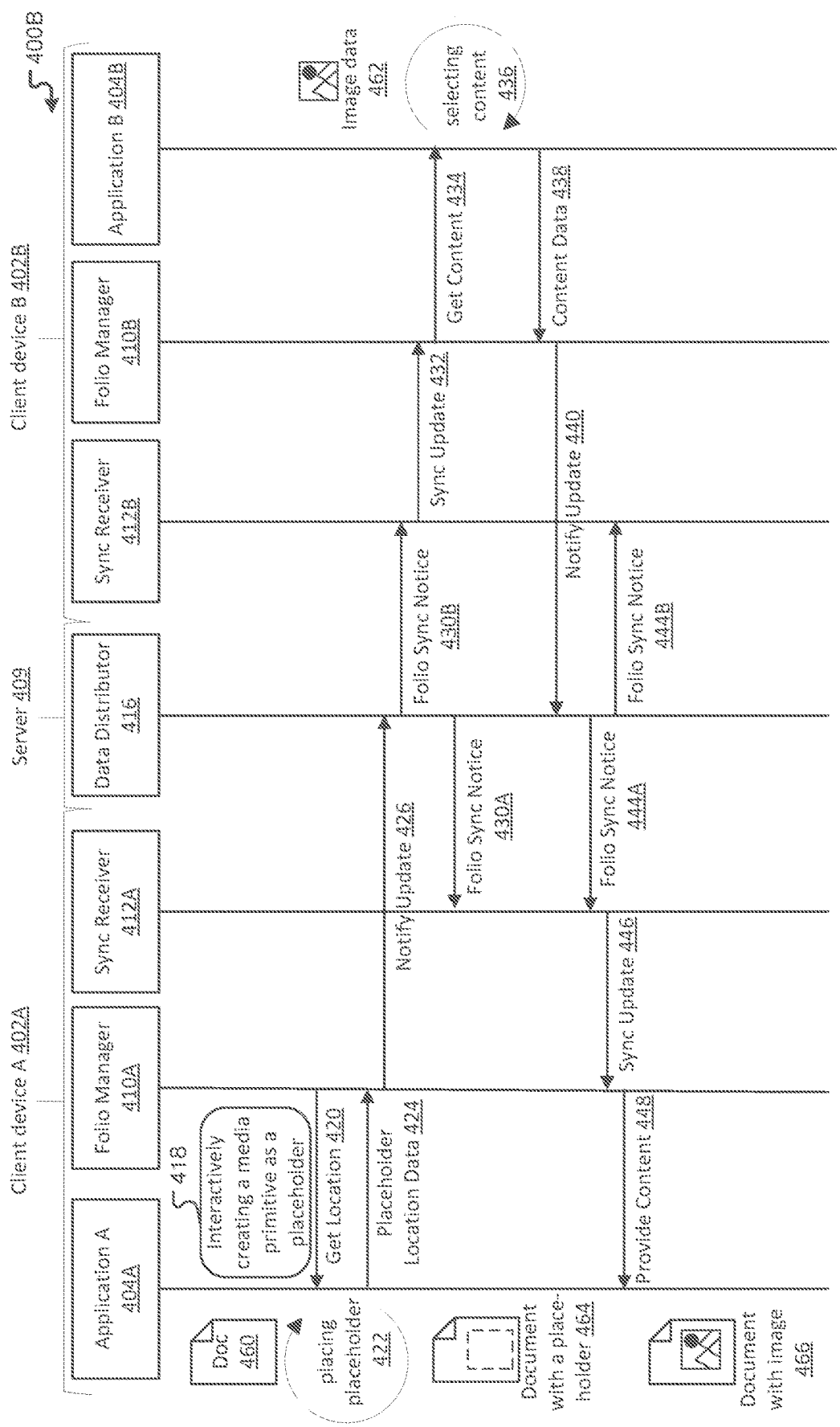
FIG. 4B illustrates an example method and timing chart for automatically updating a document based on fulfilling a placeholder with content in accordance with aspects of the present disclosure.

FIG. 4B illustrates an example methods and timing chart for automatically updating a document based on fulfilling a placeholder with content in accordance with aspects of the present disclosure. A series of operations 400B in FIG. 4B illustrates communications among client device A 402A, client device B 402B and server 409. Client device A 404A may include application A 404A, folio manager A 410A, and sync receiver 128A. Client device B 402B may include application B 404B, folio manager B 126B, and sync receiver 128B.

The user of client device A 402A may interactively create 418 a media primitive A 406A as a placeholder. Folio manager 410A requests 420 for location information for placing the content in document 460 (i.e. document with a placeholder 464 in FIG. 4A where the location information is indicated as an area inside the dotted line within the document 460 in FIG. 4B) when the content becomes available. User may operate application A 404A by an interactive place operation 422 to place a placeholder in media primitive A 406A onto a specific location within the document. In aspects, the place operation 422 may include but not limited to a drag & drop operation, copy & paste operation, and other operations that enables specifying placement of a placeholder in the document. In aspects, place operation 422 determine a location of the placeholder in the document. Document 460 is updated to a document with a placeholder indication 464.

Application A 404A sends placeholder location data 424 associated with media primitive A 406 to folio manager 410A (e.g., folio manager A 126A in FIG. 4A). In examples the placeholder may be for placing image data. In some other examples, the placeholder may be for placing other types of content, texts, sound, for example. Folio manager 410A notifies update 426 to data distributor 416 in server 409.

Data distributor 416 transmits a folio sync notice 430A to sync receiver 412A in client device A 402A Similarly, data distributor 416 transmits a folio sync notice 430B to sync receiver 412B in client device B 402B. In aspects, the folio sync notice 430A and the folio sync notice 430B both instructs the respective client devices to synchronize respective folios. In aspects, data distributor 416 maintains transaction records as logs in server 409 for respective client devices to re-synchronize the folio in case of aborting the synchronizing operations.

Sync receiver 412B redirects the folio sync notice 430B as sync update 432 to folio manager 410B. Folio manager 410B updates the folio with the placeholder location in media primitive 406B. Folio A 408A and folio B 408B are synchronized. Accordingly media primitive 406A and media primitive 406B in respective folios are synchronized, both including the placeholder. Folio manager 410B may update icon representation of the folio and the media primitive to indicate presence of placeholder as content of the media primitive.

User of client device 402B may interactively select (i.e. select operation 436) image data 462 from application B 404B to media primitive 406B. In some aspects, select operation 436 may include but not limited to a drag & drop operation, copy & paste operation, move operations and other operations that enables specifying image data 462. In aspects, application B 404B may be an application that processes or manages content and data, a photo editor, an image drawing tool, a file manager, for example. The image data 462 is shown as an example only; the image data 462 may be any data of type that the document with the placeholder 464 accommodates to be inserted. In some other aspects, the image data 462 may represent or may instead be by text, sound, metadata, hidden or unhidden. Based on the interactive operation, folio manager 401B receives the image data 462 as content data 438. The insertion of the content into media primitive 406B represents an update on media primitive 406B and folio B 408B. Accordingly, folio manager 410B notifies update 440 to data distributor 416 on server 409 for synchronizing the folios across the connected client devices (i.e., folio A 408A in client device A 402A).

Data distributor 416 transmits a folio sync notice 444A to sync receiver 412A in client device A 402A Similarly, data distributor 416 transmits a folio sync notice 444B to sync receiver 412B in client device B 402B. In aspects, the folio sync notice 444A and the folio sync notice 444B both instructs the respective client devices to synchronize respective folios. In aspects, data distributor 416 maintains transaction records as logs in server 409 for respective client devices to re-synchronize the folio in case of aborting the synchronizing operations.

Sync receiver 412A redirects the folio sync notice 444A as sync update 446 to folio manager 410A. Folio manager 410A updates folio A 408A with the image data. Folio A 408A and folio B 408B are synchronized. Accordingly media primitive 406A and media primitive 406B in respective folios are synchronized, both including the image data in place of the placeholder. Folio manager 410A may update icon representation of folio A 408A and media primitive A 406A to indicate presence of the image data as content of the media primitive.

Folio manager 410A communicates with application A 404A to provide the updated content of the media primitive. In aspects, folio manager 410A programmatically communicates with application A 404A. The communication may take place using the underlying operating system (e.g., application programming interface and inter-application object models) to send the image data in media primitive A 406A at a placeholder location within the document with the placeholder 464. Application A 404A updates the document with the placeholder 464 by inserting the image data (i.e. document with image data 466). In aspects, the series of operations from the drag & drop operation 436 in client device B 402B to modify the document with image data 466 in client device A 402A may take place automatically.

The series of operations 400B may require user of client device A 402A to have skills to use application A 404A for editing a document and to use a folio with a media primitive. User of client device B 402B is to have skills to use application B 404B for operating on image data and to use a folio with a media primitive. The operations do not impose time restriction of placing content to the document. That is, processing of the interactive promise based on automatically synchronizing folios with media primitives is unbound from devices, users, applications, and times.

As should be appreciated, the various methods, components, attributes, etc., described with respect to FIG. 4B are not intended to limit the systems and methods to the particular attributes described. Accordingly, additional topology configurations may be used to practice the methods and systems herein and/or some attributes described may be excluded without departing from the methods and systems disclosed herein.

Figure 4C:
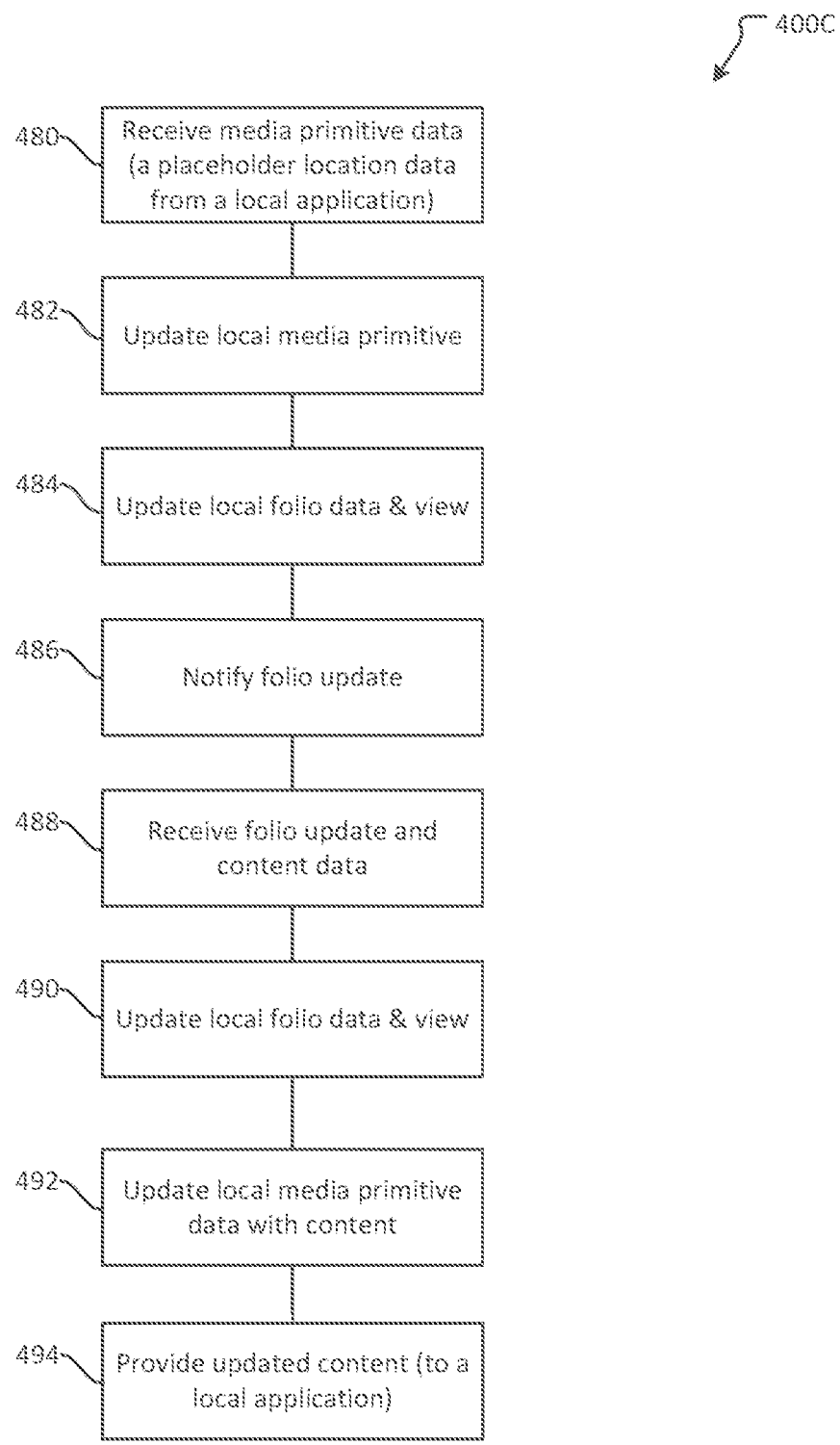
FIG. 4C illustrates an example method for automatically updating a document based on fulfilling a placeholder with content in accordance with aspects of the present disclosure.

FIG. 4C illustrate an example method, by the client device, of automatically updating a document based on fulfilling a placeholder with content in accordance with aspects of the present disclosure. A general order of the operations for the method 400C is shown in FIG. 4C. Generally, the method 400C begins with receive operation 480 and ends with provide operation 494. The method 400C may include more or fewer steps or may arrange the order of the steps differently than those shown in FIG. 4C. The method 400C can be executed as a set of computer-executable instructions executed by a computer system and encoded or stored on a computer readable medium. Further, the method 400C can be performed by gates or circuits associated with a processor, an ASIC, an FPGA, a SOC or other hardware device. Hereinafter, the method 400C shall be explained with reference to the systems, components, devices, modules, software, data structures, data characteristic representations, signaling diagrams, methods, etc., described in conjunction with FIGS. 1, 2A-C, 3, 4A-B, 5A-B, 6A-D, 7, 8A-B.

Receive operation 480 receives media primitive data. In aspects, a user may interactively create a new media primitive (e.g., media primitive 406A in FIG. 4A) as a placeholder (e.g., placeholder 407A of FIG. 4A) of content prior to receiving the media primitive data A type of the content in the media primitive may be image or text, for example. The media primitive data may include placeholder location data to place the content in a specific document (e.g., document 464 in FIG. 4A) or a file. The placeholder location data may specify a coordinate that is 10.0 cm from a top edge and 2.5 cm from a left edge on page three of a document, for example. The media primitive may be of a type "image" with a dimension of 800 pixels horizontally by 800 pixels vertically, for example. The document may be stored in a file called "travel_doc." The file may associated with a specific application (e.g., Application A 404A in FIG. 4A) for editing the document. That is, the media primitive serves as a placeholder for an image with the aforementioned dimension to be inserted at the specific location of the document. At the time of this receive operation 480, content image data has not been specified.

Update operation 482 updates the media primitive data with the placeholder location data. In aspects, folio manager add data associated with the placeholder in the media primitive. The data may include the dimension, one or more types (e.g., raster/vector image data, text, sound, etc.) of content that the document accommodates to be inserted in place of the placeholder, a location of the placeholder within the document, the identifier of the document (e.g., a file name). The media primitive may include the data as a text-based format with tags and delimiters, XML or a comma-separated values, for example, or a binary stream form of structured data. Folio manager may store the updated data of the media primitive in a local storage of the client device. In some other aspects, the local storage of the client device may be a physical data storage or a virtual data storage that is mapped to a memory space on a server in the cloud across the network. In other aspects, the locally stored data may be accessible by the data distributor on the server. In some other aspects, the locally stored data may be transmitted by the client device to the server. In some aspects, rendering of user interactive indicator of the media primitive may be updated based on the placeholder location data. An icon of the media primitive may include an indicator of the placeholder (e.g., a dotted-line empty square) for rendering on the display of the client device.

Update operation 484 updates local folio data in the local client device. The update operation 484 may update display rendering of the folio by replacing an empty folio with a folio with the media primitive. The media primitive is included in a folio (e.g., folio A 408A of FIG. 4A) in the client device (e.g., client device A 402A in FIG. 4A). In aspects, update operation 484 stores data that represent the updated folio in the local storage of the client device. A folio may be represented by structured data that include the metadata (a name, style configurations, an indicator of its constituents in the folio, etc.) of the folio and information about the updated media primitive as its constituent. The structured data may be stored in a tag or delimiter-based data format, XML for example, or a binary data stream in one or more files.

Notify operation 486 notifies the update of the folio. In aspects, the update notice may be transmitted by the client device (e.g., client device A 402A) to data distributor 416 connected to the network 134. The update notice of the folio may include a status information (e.g., new, updated, deletion, etc.) and updated data and metadata associated with the folio and its constituents. The update notice may represent a status message as a part of a transactional process for resilient synchronization of distributed folios across users and devices. Communications with the data distributor, including the update notice, during the synchronization operations maintains atomicity, consistency, isolation, and durability of data by maintaining transaction logs and locally caching data in the client devices and the data distributor in the server, for example. In case of a failure in notifying the updated folio, the client device may initiated one or more retries of the notify operation 486 based on the locally stored data. In some aspects, folio update receiver (e.g., folio update receiver 150 in FIG. 4A) may receive the update notice and proceed to synchronize the folio in other client devices (e.g., client device B 402B).

In aspects, the client device may receive a status update notification from the data distributor, indicating a successful receipt of the update notice but before completing the synchronization of the folios across the users and the devices. The client device may subsequently receive another status update notification, which indicates a result of the synchronization as coordinated by the data distributor on the server. The result of the synchronization may include one of success, failure, etc. The success indicates a confirmed successful synchronization of the folios across the users and the devices. The failure indicates a confirmed failure of the synchronization. In some aspects, the client device may roll-back the update of the folio to a previous state based on the transaction log and data in the local storage. In some other aspects, the client device may further update metadata and data of the folio and its constituent based on instructions with data received from the data distributor in the server, which dictates the synchronization process.

Receive operation 488 receives a folio update and content data. In the exemplary flow, a user of a second client device (e.g., client device B 402B in FIG. 4A) may add image data 462 as content (e.g., content placeholder 407B) of a media primitive (e.g., media primitive 406B in FIG. 4A) in the synchronized folio (e.g., folio B 408B in FIG. 4A). Accordingly the folio update relates to the synchronized folio (e.g., folio A 408A in FIG. 4A) in the first client device (e.g., client device A 402A). The content data may be image data (e.g., image data 462 in FIG. 4A). In aspects, the received operation 488 receives the update from the data distributor on the server.

Update operation 490 updates local folio data and display rendering of the folio. The local folio data may be for Folio A 408A, for example. The local folio data includes data that relate to media primitives and tools in the folio. In aspects, update operation 490 updates the local storage with the data receive. The updated rendering of the folio may indicate that the folio has recently been updated.

Update operation 492 updates local media primitive and display rendering of the media primitive. In aspects, the update operation 490 updates a media primitive (e.g., media primitive 406A in FIG. 4A) with the received content data (e.g., image data that is a copy of the image data 462 in FIG. 4A). In aspects, the rendering of the media primitive may include a thumbnail or other indicators that indicate the media primitive including content (e.g, text, image, sound etc.). The received content may be stored in the local storage in the client device. In the current exemplar scenario, the content is a copy of image data for insertion to the document. In some other aspects, the content may be of some other data type, text, sound, binary, or any other data type that the document accommodates for insertion.

Provide operation 494 provides updated content in the media primitive to a local application (e.g., Application A 404A in FIG. 4A). In aspects, the provide operation 494 may use an application user interface to automatically insert the image data at a specific location within the specific document. Image data that is identical to image data 462 in client device B 402B may be placed at the location that is 10.0 cm from a top edge and 2.5 cm from a left edge with the dimension of 800 pixels horizontally and 800 pixels vertically on page three of a document with the file name "travel_doc" in client device A 402A, for example. In some aspects, the insertion of the content of the media primitive may replace the placeholder in the document. In some other aspects, the insertion of the content may keep the placeholder in the document for further insertions of content later times as the content of the media primitive is updated at a later time. In yet some other aspects, the document renders the content within the placeholder by rendering the content (the image data) without copying from the media primitive to the document. The local application may access and look up the content of the media primitive in the folio every time that the document is opened and rendered.

As should be appreciated, operations 480-494 are described for purposes of illustrating the present methods and systems and are not intended to limit the disclosure to a particular sequence of steps, e.g., steps may be performed in different order, an additional steps may be performed, and disclosed steps may be excluded without departing from the present disclosure.

Figure 5A:
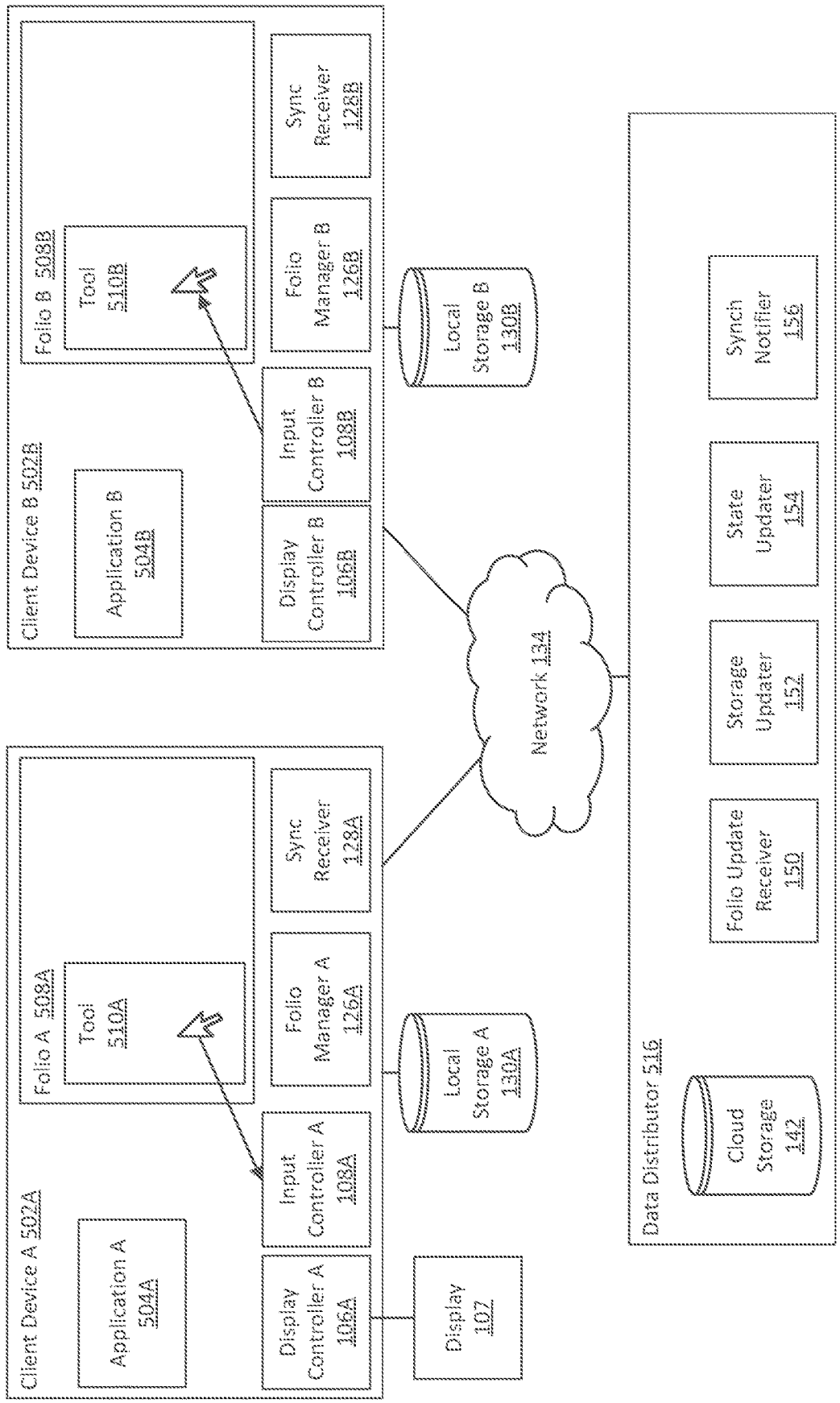
FIG. 5A illustrates an overview of an example system for interactively sharing a telepointer across devices in accordance with aspects of the present disclosure.

FIG. 5A illustrates an overview of an example system for interactively sharing a telepointer in a computing device as a tool in a folio in accordance to aspects of the present disclosure. In particular System 500A may represent a system where a computing device attaches a display device. Telepointer operations from other distinct computing device is shared at the computing device. The display device of the computing device displays the shared telepointer operated by a user of the other distinct computing device. Multiple users with respective computing devices gather and collaborate at a location with a large display, for example.

Client device A 502A comprises application A 504A, folio A 508A, display controller A 106A, input controller A 108A, folio manager A 126A, and sync receiver 128A. In particular, client device 502B includes display 107 and local storage A 130A. Client device B 502B comprises application B 504B, folio B 508B, display controller B 106B, input controller B 108B, folio manager B 126B, and sync receiver 128B. According the example system 500A, A user of client device A 502A uses its display 107 while collaborating with a user of client device B 502B. A telepointer of the user of client device B 502B appears on display 107 of client device A 502A.

In aspects, folio A 508A and folio B 508B are automatically synchronized. Accordingly constituents of the respective folios, tool 510A of a telepointer tool type and tool 510B, are synchronized. Updates made on tool 510B is automatically synchronized and tool 510A receives the update. Tool 510B of a telepointer tool type is associated with input controller B 108B of client device 502B. In some aspects, input controller B 108B receives motion data of input devices, a mouse and/or a pen, for example, on client device B 502B. input controller B 108B provides the motion data of the input devices to the telepointer tool 510.

Input controller B 108B captures the motion data of a mouse and/or a pen on client device B 502B. Tool 510B receives the motion data from input controller B 108B. Tool 510B provides the motion data to folio manager B 126B. Folio manager B 126B transmits a update notification of folio B 508B and the motion data based on tool 510B to data distributor 516.

Folio update receiver 150 in data distributor 516 receives the update notification and the motion data from folio manager B 126B of client device B 502B. Storage updater 162 updates shared folio data in cloud storage 142. State updater 154 updates state information of updating folios that are associated with folio B 408B. In aspects, state updater 154 maintains transaction records and logs to provide resiliency in update operations of folios among the associated folios. In the example, folio A 508A in client device A 502A is associated with folio B 508B in client device B 502B. Sync notifier 156 notifies sync receiver 128A in client device A 502A with a command to synchronize folio A 508A with the updated folio B 508B. Sync receiver 128A receives the sync update command to update folio A and its constituents. Sync receiver 128A receives the motion data of the telepointer for tool 510A.

Accordingly tool 510B of folio B 508B in client deice 502B and tool 510A of folio A 508A in client device 502A are automatically synchronized. Folio manager A 126A updates tool 510A with the motion data. Receiving the motion data, tool 510A provides the motion data to input controller A 108A as indicated by the directed arrow in FIG. 5A. Input controller A 108A processes the motion data as a telepointer motion. Accordingly input controller A 108A provides the telepointer motion data to display controller A 106A for rendering the telepointer on display 106B. In some aspects, there may be more than one telepointers being rendered on display 107. Each telepointer may be rendered with a distinct shape and/or a color to enable viewers of display 107 to distinguish one telepointer from another. In some aspects, input controller A 108A may provide a selection input operation (e.g., a click input event) of telepointers. Input controller B 108B may provide data based on the selection input operation to tool 510B. The update of data on tool 510B causes a synchronization of the tool 510B and tool 510A. Tool 510A may provide the input data to input controller 508A for processing the selection input operation on client device A 502A. Accordingly, display 106B may provide a result of the selection input operation by changing a rendering of the telepointer and other updates on display, for example.

As should be appreciated, the various methods, devices, applications, features, etc., described with respect to FIG. 5A are not intended to limit the system 500A to being performed by the particular applications and features described. Accordingly, additional controller configurations may be used to practice the methods and systems herein and/or features and applications described may be excluded without departing from the methods and systems disclosed herein.

Figure 5B:
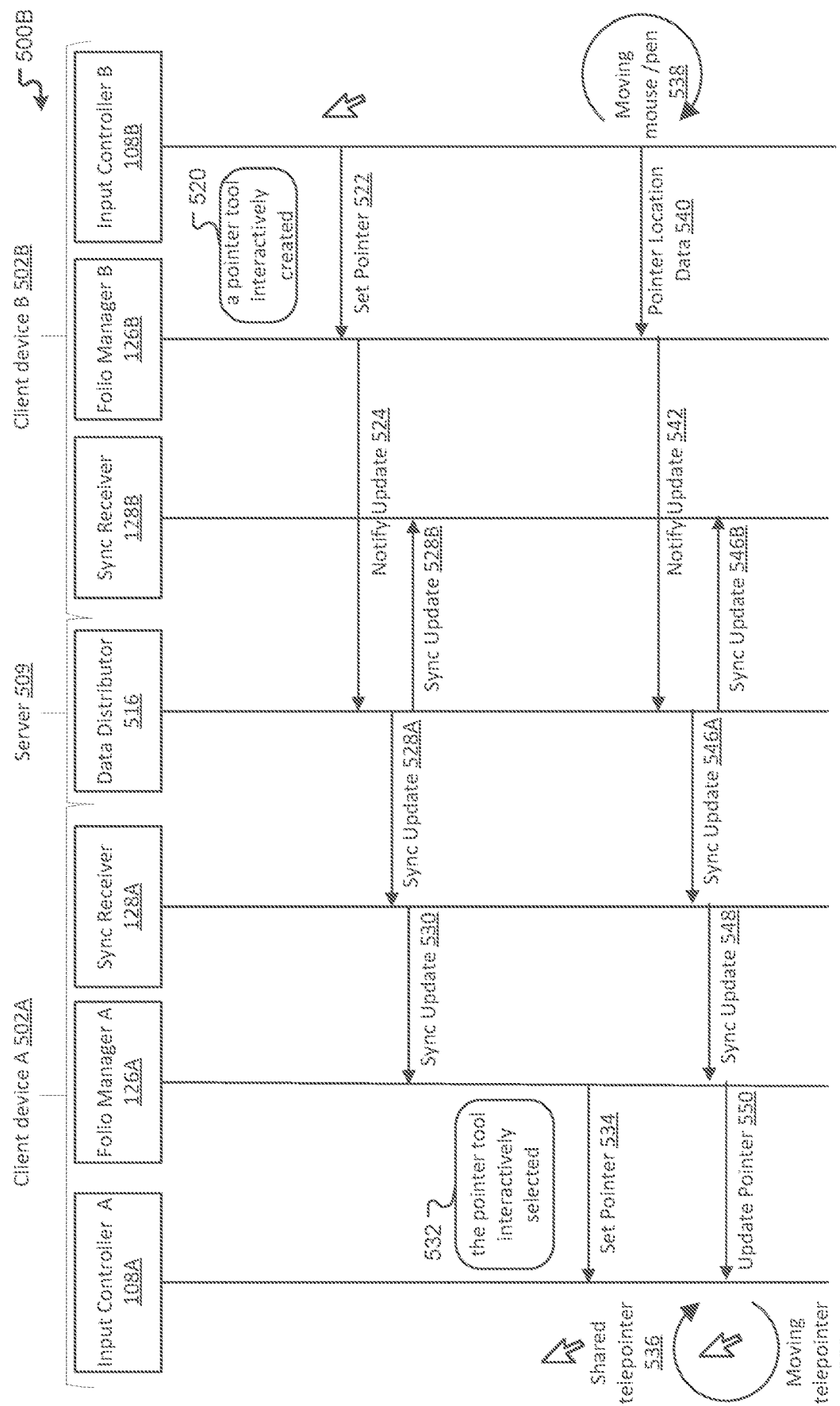
FIG. 5B illustrates an example method and timing chart for interactively sharing a telepointer across devices in accordance with aspects of the present disclosure.

FIG. 5B illustrates an example methods and timing chart for interactively sharing a telepointer in a computing device in accordance to aspects of the present disclosure. FIG. 5B illustrates communication 500B among client device A 502A, client device B 502B and server 509. Client device A 502A may include input controller A 108A (i.e. input controller A 108A in FIG. 5A), folio manager A 126A, and sync receiver 128A. Client device B 502B may include input controller B, folio manager B 126B, and sync receiver 128B. In aspects, a telepointer is created for control by a user of client device B 502B. The telepointer is shared with client device A 502A for rendering on a display (e.g., display 107 in FIG. 5A) of client device A 502A.

Create operation 520 creates a tool of a telepointer type in a folio (i.e. tool 510B of folio B 508B in FIG. 5A) in client device B 502B by a user of client device B 502B. To link the created tool with a series of input operations in client device 502B, input controller B 108B send a Set Pointer command 522 to folio manager B 126B. Folio manager B associates tool 510B with input controller (e.g., input controller B 108B). Folio manager B transmits a notify update 524 message to data distributor 516 in server 509. Data distributor 516 sends a sync update 528B command to sync receiver 128B of client device B 502B. Similarly, data distributor 516 sends a sync update 528A command to sync receiver 128A of client device A 502A. The sync update command instructs a recipient client device to update folios and respective constituencies (e.g., media primitives and tools).

Sync receiver 128A of client device A 501 receives a sync update 528A command and provides the sync update 530 command to folio manager A 126A. Folio manager A 126A updates respective folios in client device A 502A. Accordingly, folio manager A 126A makes the telepointer in a tool (i.e. tool 510A) for a user of client device A 502A. In aspects, a user may interactively select the tool to use the shared telepointer in client device A 502A.

A user of client device A 502A may interactively select 532 the pointer tool from the tool 510A. Based on the selection, folio manager A 126A sets 534 a telepointer to input controller A 108A. In aspects input controller A 108A communicates with display controller A 106A to render a shared telepointer 536 on display 107. In aspects, the shared telepointer 536 is displayed on display 107 of client device A 502A.

The shared telepointer 536 moves based on input motion that takes place in client device B 502B. The user of client device B 502B moves 538 an input device a pen and/or a mouse for example in client device B 502B. Input controller B 108B generates and sends pointer location data 540 to folio manager B 126B as an update to the telepointer tool (i.e. tool 510B of folio B 508B in FIG. 5A). Folio manager B 126B sends a notify update 542 notification to data distributor 516 (i.e. data distributor 516 in FIG. 5A) of server 509.

Data distributor 516 sends a sync update 546B command to sync receiver 128B of client device B 502B Similarly data distributor 516 sends a sync update 546A command to sync receiver 128A of client device A 502A. The sync update command instructs a recipient client device to update folios and respective constituencies (e.g., media primitives and tools).

Sync receiver 128A of client device A 501 receives a sync update 528A command and provides a sync update 530 command to folio manager A 126A. Folio manager A 126A updates respective folios in client device A 502A. Folio manager A 126A updates 550 a location of the telepointer to input controller A 108A. In aspects input controller A 108A communicates with display controller A 106A to render movement of the shared telepointer 552 on display 107.

In aspects, movement data of the shared telepointer may be transmitted by client device B 502B to client device A 502A through data distributor in server 509 as a data stream instead of batch data transmission where data is transmitted in a bulk. By providing the motion data in a stream, movement of the shared telepointer may be rendered smoothly.

In some aspects, the user of client device A 502A with a display 507 may create a tool with a telepointer type in a folio and associated the tool with display 507. The present disclosure may share the folio with the user of client device 502B. Seeing the tool in the synchronized folio with the tool of telepointer type in client device B, the user of client device B 502B may select the tool and associate the tool with input controller B 108B of client device B 502B. In aspects, the synchronized tool and input controllers of respective client devices establishes a path of automatically transmitting the motion data based on synchronizing folios. Thereafter, movement of an input device (e.g., a pen and/or mouse) in client device 502B results in movement of the shared telepointer on display 107 in client device 502A. In some aspects, multiple users may use the tool of telepointer type to display multiple telepointers for respective users on display 107 of client device 502A.

As should be appreciated, the various methods, components, attributes, etc., described with respect to FIG. 5B are not intended to limit the systems and methods to the particular attributes described. Accordingly, additional topology configurations may be used to practice the methods and systems herein and/or some attributes described may be excluded without departing from the methods and systems disclosed herein.

As should be appreciated, the exemplar scenario of sharing the telepointer as a tool of a folio represents an example of using a tool in a folio and the usage of the tool is not limited in any way. A tool may associated with any device and application for sharing functionalities related to processing data and in a variety of situations, such as when data is processed as part of a collaborative effort with other users and client devices. Sharing such by synchronizing tools in the folio improves efficiency of transferring user activities during a collaborative work session in both synchronous and asynchronous situations. The synchronization of the tools using the disclosed folios is resilient against possible failures in processing among the client devices. In doing so, the present disclosure provides user interfaces for accessing the tools and the folios which are consistent across the users and the client devices. Complex user operations may be performed on the user's respective client devices as the tools may be associated with any input and output devices and application, whether physical or virtual, in a client device.

Figure 6A:
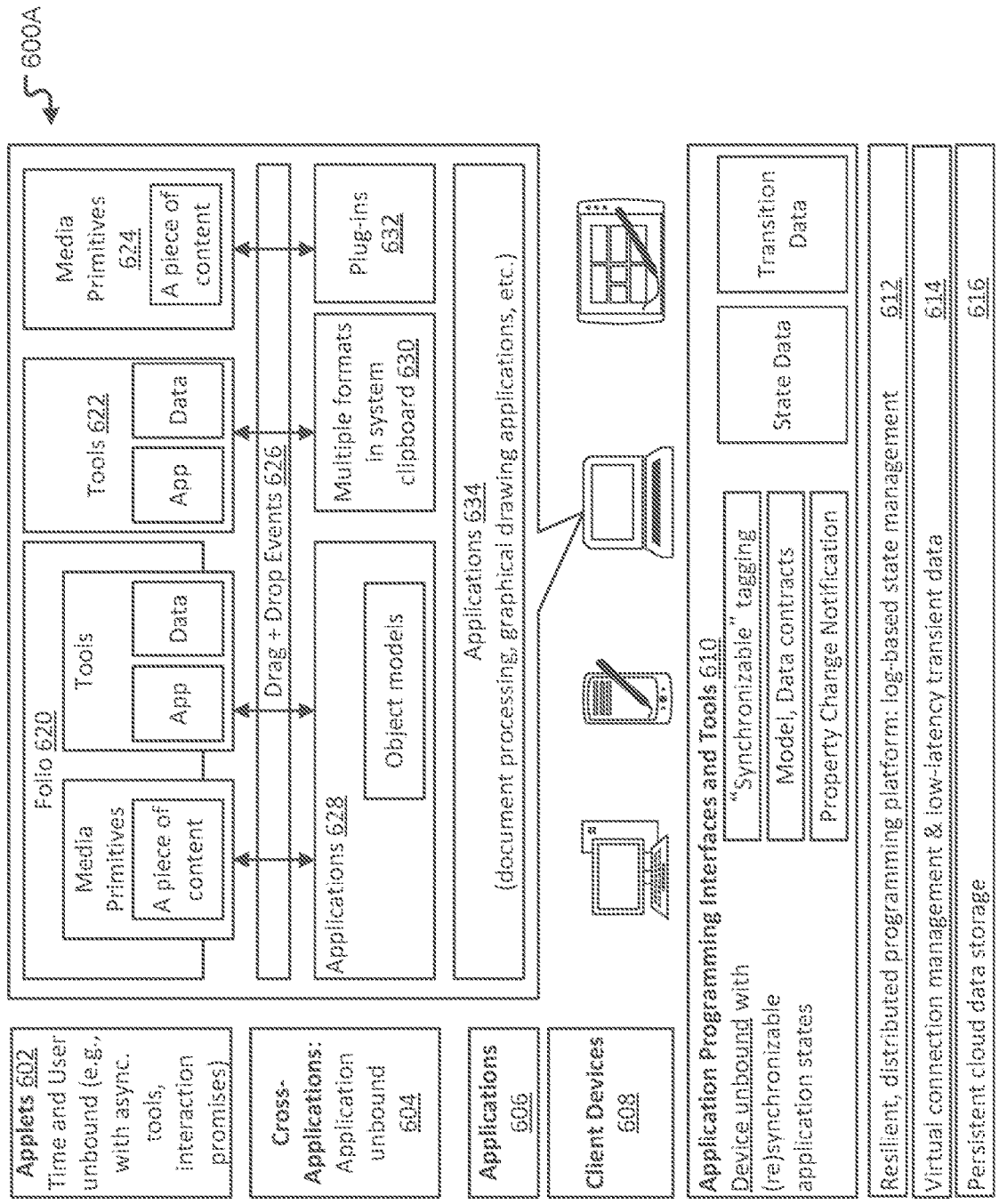
FIG. 6A illustrates an overview of an example system for sharing content and tools in accordance with aspects of the present disclosure.

FIGS. 6A-D illustrate examples of sharing content based on synchronizing folios in accordance with aspects of the present disclosure. FIG. 6A illustrates an example structure of interactively sharing content among users and devices in accordance to aspects of the present disclosure.

The present disclosure provides a distributed system with resiliency based on transaction record management, unlike use of ad-hoc TCP connections or UDP streaming, for example. Each client keeps a local copy of shared state. Changes to the local state synchronize in real-time, with the state updating (or "recovering" on a new device) as soon as a connection is established. Clients within a federation can communicate through the cloud, which they access via a federation-specific connection string containing the information needed for access authorization.

The present disclosure may leverage an infrastructure based on declarative database techniques to persist data, providing virtual resiliency by capturing state changes in a deterministically replayable log. This is done at a level in a durable, failure-resilient, and performant manner via the cloud. Virtualization of inter-device connections combined with virtual resiliency of state changes makes the system not only robust to IP address changes, but also facilitates migration of user interface operations from one device to another. As long as clients can access the cloud they can (re) synchronize application state—implementing a transition of states from one machine to another as a cross-device fail-over. In aspects, the cross-device fail-over provides a series of operational steps to resiliently transition an update of a folio and its constituents on one computing device to another computing device. The system eliminates the need to implement extra program logic to handle complex distributed failure cases.

In the present disclosure, folios and its constituents may be rendered as top-level, semi-transparent windows in a multi-window operating system, making them always visible and always available as drag & drop targets, no matter the current application, web page, or file system window. Users of client devices may drag & drop by mouse, pen, or direct-touch to pass these rich data formats amongst Applets and unmodified external applications. In aspects, selecting and placing (e.g., drag & drop, copy & paste, etc.) content and data to a media primitive or a tool respectively add data in three formats: (i) the path to a copy of the image or other data in the file system; (ii) a bitmap or other formats of the content or the data to enable rich feedback and compatibility with unmodified applications; and (iii) an internal format that passes an identifier of the content (e.g., image data) to folios and for use in processing interaction promises.

When the user places an object of a media primitive or a tool onto an unmodified external application, inter-program communication takes places using application programming interface or object models associated with the operations. Media primitives and tools provide generalizable abstract classes that enable developers to add support for new applications. Alternatively, developers can modify an external application to access clipboard data format directly. For legacy applications the data transfer with external applications may take place based on clipboard formats, file paths, bitmap images, and text strings, for example.

Unbinding actions from time is fundamental to the disclosed system's technical underpinnings. For example, when a device joins a federation, it deterministically replays shared model updates from the session. Hence, the system may migrate activity to another device immediately, or at a later time, or even revisit past states so long as they remain available in the log. The system provides "time unboundness" in the user interface through interaction promises. Interaction promises allow users to insert placeholders for content that is not yet available.

Tools offer app-native support for time-unbound interaction promises. For example, the color picker can accept a selection (shape) dragged from an external image editor application. The system keeps a reference to this shape, and updates the selection's fill color whenever the user samples a new color with the color picker.

In aspects interactions that takes place in the system are unbound from any particular user. For example, the interaction promise works in a collaborative scenario, where one user can insert an image placeholder, then share with a collaborator via folio. The collaborator can then fulfill it (e.g. by taking a photo with their device's camera), and share back through the folio.

Figure 6B:
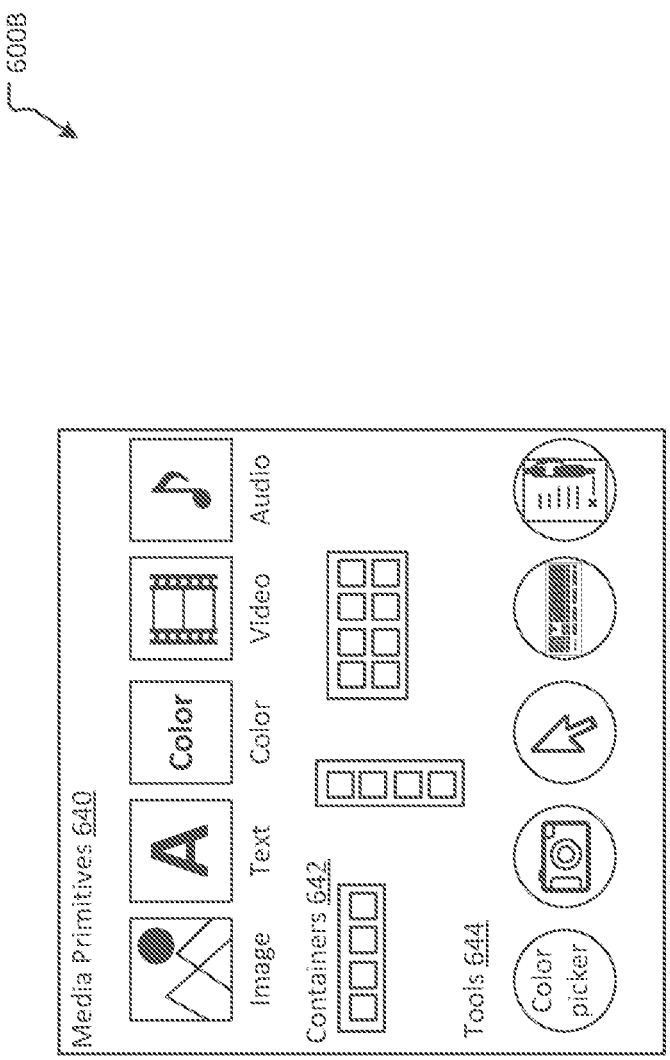
FIG. 6B illustrates an example of screen in accordance with aspects of the present disclosure.

FIG. 6B illustrates an exemplar user interface for creating various objects in a folio in accordance to aspects of the present disclosure.

Applets provides user interface objects across the window manager and other applications. Applets are independent executables, visible as compact regions that may be displayed when needed by the users (e.g., when a mouse hovers at an icon that represents the applet) and then faded into background when not in use. The user can reposition them as desired, or dismiss when no longer needed. Applets are semi-transparent UI elements. Semi-transparency allows partial visibility of underlying content or program windows. But when the user selects an Applet (by touching or by hovering over with the mouse or a pen-tip pointer), the Applet fully materializes, becoming opaque. The Applet fades back to a semi-transparent state when no longer selected or the pointer moves away. Hence Applets are always visible, always on top, and always available for drag & drop from any program or web page.

Through these Applets, UI strives to make cross-device interactions visible and local. The present disclosure provides windows that may be displayed when needed by the users (e.g., when a mouse hovers at a folio icon) and then faded into background when not in use. Such reification allows domain objects to combine with interaction instruments, which is well-suited to multi-surface environments.

In aspects. Applets enables domain objects to combine with interaction instruments while interoperating with the operating system, window manger, application windows, and one another through instrumental interaction. The user can launch Applets from a taskbar (FIG. 6B). Applets may be displayed in a semi-transparent window, where the window is displayed when needed by the users (e.g., when a mouse hovers at a folio icon) and then faded into background when not in use. Further interactions with the Applets and Tools rendered in the semi-transparent windows often yield Applets directly, without having to revisit this taskbar.

The present disclosure provides five mechanism to interface to unbind content and tools from device, application, user, and time:

A folio is an applet that provides a cross-device portal for individual's work and collaborative work. A folio provides a place to stash pieces of single or mixed-media content (media primitives and containers) as well as interactive tools. The portal allows for the access of applications and/or data in tools and content in media primitives across different users and across different devices.

Interaction promises are placeholders for content, allowing deferral of select actions or decisions. For example, users can drag empty media primitives, where the contents of the images are not yet available, to create and share promises for future fulfillment.

Tools encapsulates a number of user interface operations, inputs, and interactive behaviors. Users can drag tools onto content (or use them as drop targets) to achieve various effects via instrumental interaction. Media primitives comprise content, such as images, that are displayed in semi-transparent windows to make them directly actionable for cross-device use.

Containers are visually represented as a splayed-out sheaf. Containers is an Applet. Container offers an always-available, multi-object visual clipboard that users can dock to any edge of the screen for convenient collection and curation of content.

FIG. 6C illustrates exemplar operations based on automatically synchronizing folios in accordance to aspects of the present disclosure. Example: Alice is an architect at a small firm, currently working on a critical report ensuring that her building design is being constructed properly at a far-flung construction site:

Scenario 1. Create a Folio: Alice launches the taskbar from the system tray, where she can create media primitives, containers, folios, and tools. She creates a folio—an Applet that passes content across devices. Folio may be displayed in a semi-transparent window, where the window is displayed when needed by the users (e.g., when a mouse hovers at a folio icon) and then faded into background when not in use. The folio is accessible via drag & drop from other programs or Applets.

Scenario 2. Collect Images On the Go: On the train, using her tablet, Alice creates a Container from the taskbar. She looks through her folder of site photos and drags & drops the images she wants into the Container. Alice drags this Container into a folio that she created. Later, in her office, she opens it from her desktop, giving access to the shared Container with the images collected on her tablet.

Scenario 3. Create & Fulfill a Promise: At her desktop, Alice realizes she doesn't have a photo of the new building's entrance. Alice creates an empty placeholder and inserts it into her document. Through a folio, she shares it with John, a co-worker onsite at construction. That afternoon, John takes a photo of the new entrance to fill the placeholder. When Alice retrieves the image from the folio, her document updates, fulfilling the Promise.

Scenario 4. Share Contents on a Large Display: In a meeting room with a large display, Alice discusses the report with two colleagues. From a social distance, they can each pass their mouse pointer to the large display through a folio. Alice then stands to present, while her colleagues tele-point to indicate parts of the document they have questions about. Alice uses the Extract tool to take a snapshot of the current page. Using a pen, she then annotates the document as her colleagues indicate areas of concern. She captures the markup by extracting the page once again, and for comparison she drags the two snapshots back into a shared folio.

Unlike previous systems, the present disclosure provides a system hosts "rich clients" where the shared layer plugs directly into application state at the binding level of a programming language. The present disclosure provides as its integral part durable shared state managed in a server in the cloud, in a principled distributed system architecture. Accordingly, the present disclosure provides a distributed system that unbinds all four of the cornerstones of devices, applications, users, and times, for both content and tools.

Figure 6D:
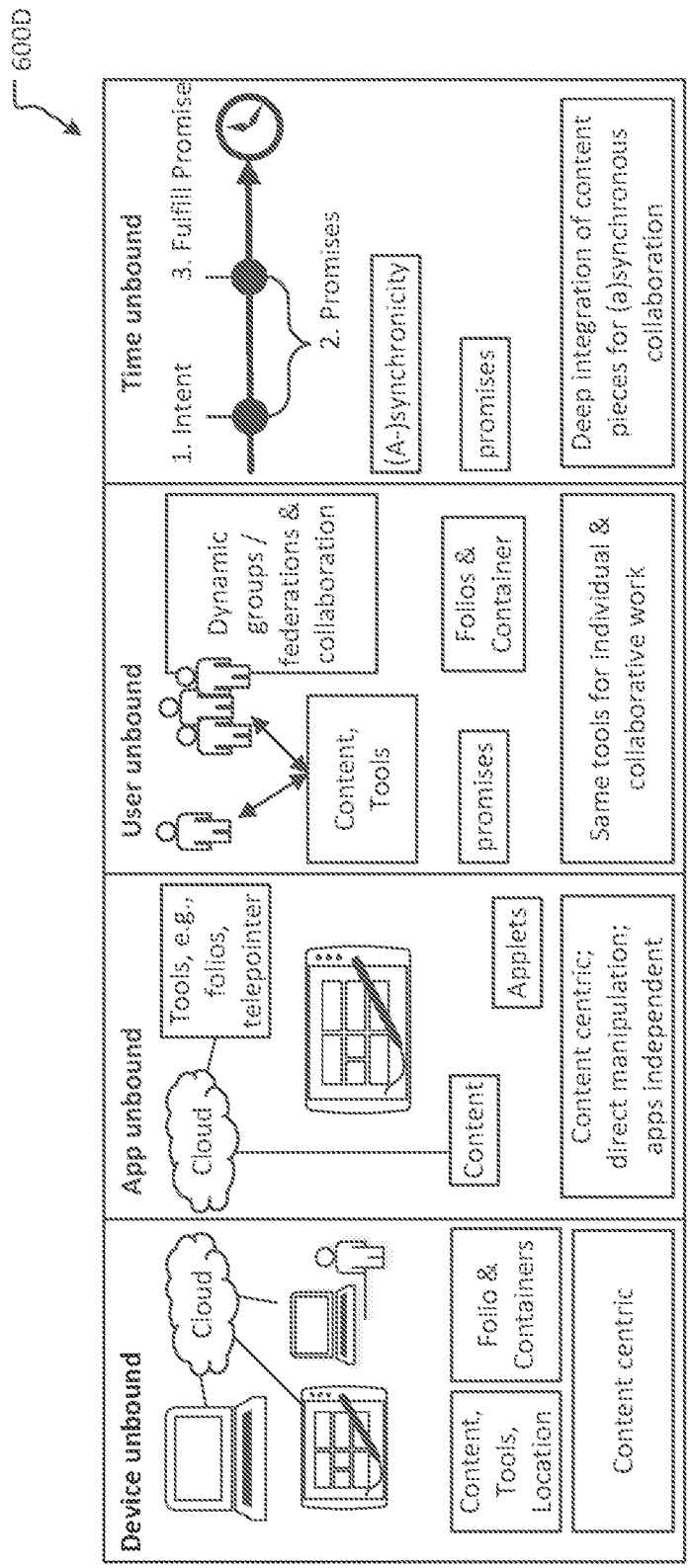
FIG. 6D illustrates exemplar benefits of the system in accordance with aspects of the present disclosure.

FIG. 6D illustrates the present disclosure that unbounds collaborative work from devices, applications, users, and times in accordance to aspects of the present disclosure. Synchronizing content based on shared folios is based on a resilient distribution system with transaction management. Applets run on individual devices, but the underlying system preserves all updates to program state in a durable log via the cloud. Thus, migration of user activity from one device to another is a special case of fail-over to a new machine. But the same durable logging mechanism affords highly performant synchronization, also enabling parallel (multiple device) experiences. This allows the unbinding of interface elements from a particular device.

The present disclosure unbounds applications by providing programmatically transferring data between media primitive and external applications through application programming interface, for example. The system provides semi-transparent, always-on-top Applets to represent folios, media primitives, and tools. Applets may be displayed in a semi-transparent window, where the window is displayed when needed by the users (e.g., when a mouse hovers at a folio icon) and then faded into background when not in use. Integrations of media primitives and tools with external applications unbounds applications in sharing content and tools. In aspects, a tool comprises data and an application that processes the data. When use the application is protected by licenses, an additional user license may be added to the tool. That is, sharing and synchronizing the tool passes the data and the application. In some aspects, other devices with synchronized tool may lack an application to process the data that has been shared by the tool. This way, sharing the tool not only provides data but also the application with a user license for other users to use the application to process the data on respective devices, for example.

The present disclosure unbounds users in sharing content and data. Respective users may continue to use applications that they are familiar with. Yet, the present disclosure enables users to share content and with other among users who use different types of applications. Since Applets roam across devices, they afford connections between people—multiple users on multiple devices—as well. Yet in current practice, many of the tools one uses for collaboration differ sharply from the everyday tools used for individual work.

One can set aside an ephemeral piece of information for later use in one's individual work—via exactly the same interaction mechanisms used to pass a screen grab to a co-located (or even remote) collaborator.

The present disclosure unbounds time in sharing content during a collaborative work by providing both synchronous and asynchronous interactions among users and among client devices. In particular, interaction promises decouples time when a need for content arises and time when content becomes available by a collaborator. The present system provides a time to specify a location of a placeholder in a document. The present system further provides a time to insert content by replacing the placeholder by the content are decoupled. The two occasions are decoupled by removing a requirement for the two occasions to coincide. Once there is a deterministically replayable log of distributed state, application logic does not necessarily have to "failover" immediately. Likewise, finer-grained interactions can also be left latent, to migrate or synchronize at a later time. In some aspects, digital asset rights may be automatically updated and/or provided in digital rights management when the content being inserted to the placeholder is a copyrighted material. Data distributor may update the digital asset rights interactively with the digital rights management. In some other aspects, digital license rights may be automatically updated and/or provided in digital license management. The client device that has received the synchronized media primitives and/or tools lack an application that is required to process the received content and/or data, for example. The client device may be provided by the data distributor, for example, digital license and an application under the digital license to process the received content and/or data as appropriate. Data distributor may obtain and distribute the application with the digital license interactively with the digital license management.

As should be appreciated, the various methods, components, attributes, etc., described with respect to FIGS. 6A-D are not intended to limit the systems and methods to the particular attributes described. Accordingly, additional topology configurations may be used to practice the methods and systems herein and/or some attributes described may be excluded without departing from the methods and systems disclosed herein.

Figure 7:
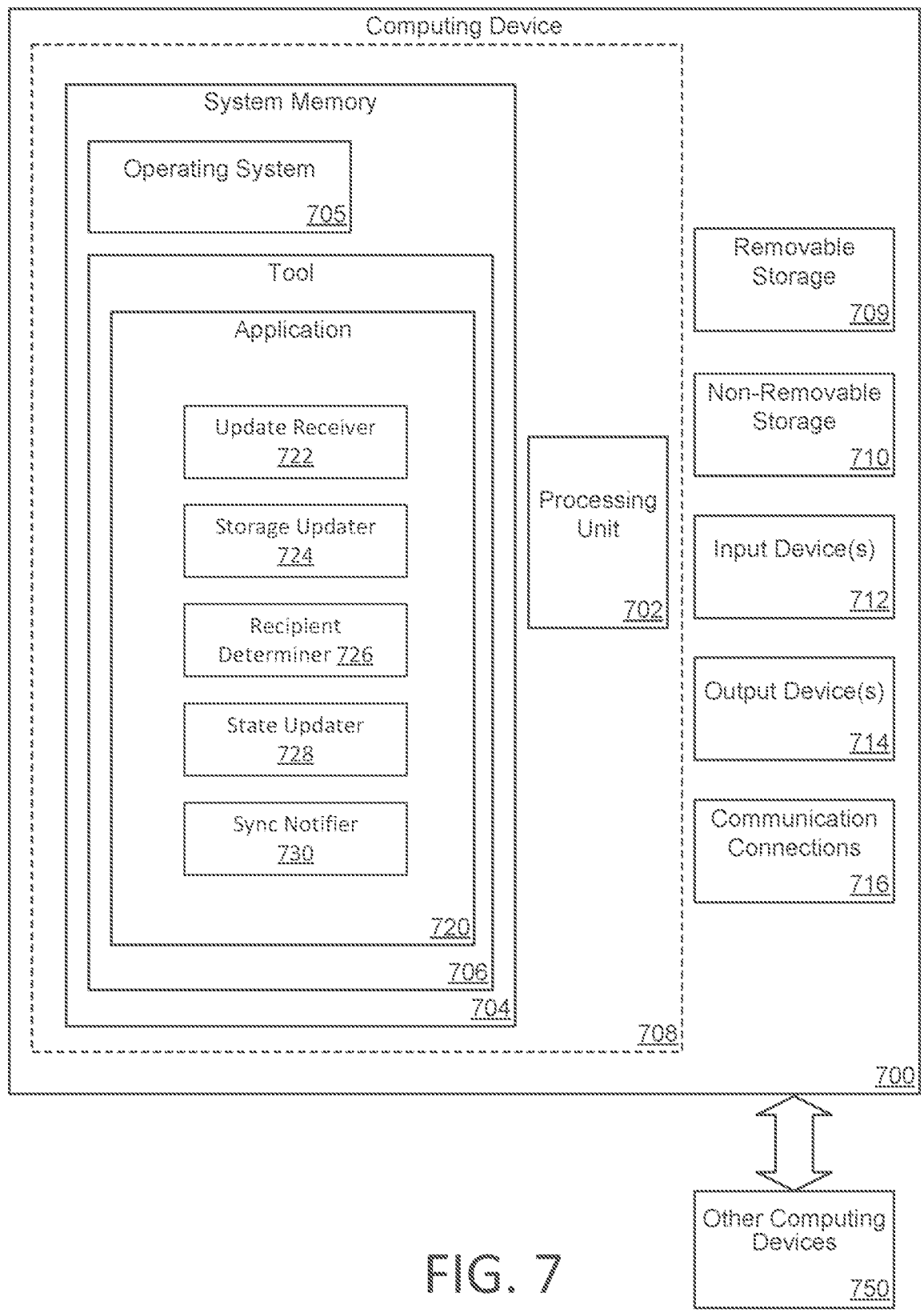
FIG. 7 is a block diagram illustrating example physical components of a computing device with which aspects of the disclosure may be practiced.

FIG. 7 is a block diagram illustrating physical components (e.g., hardware) of a computing device 700 with which aspects of the disclosure may be practiced. The computing device components described below may be suitable for the computing devices described above. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program tools 706 suitable for performing the various aspects disclosed herein such. The operating system 705, for example, may be suitable for controlling the operation of the computing device 700. Furthermore, aspects of the disclosure may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program tools and data files may be stored in the system memory 704. While executing on the processing unit 702, the program tools 706 (e.g., data distribution application 720) may perform processes including, but not limited to, the aspects, as described herein. The data distribution application 720 includes an update receiver 722, a storage updater 724, a recipient determiner 726, a state updater 728, a sync notifier 730, as described in more detail with regard to FIG. 1. Other program tools that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 700 may also have one or more input device(s) 712, such as a keyboard, a mouse, a pen, a sound or voice input device, a touch or swipe input device, etc. The output device(s) 714 such as a display, speakers, a printer, etc. may also be included. The aforementioned devices are examples and others may be used. The computing device 700 may include one or more communication connections 716 allowing communications with other computing devices 750. Examples of suitable communication connections 716 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program tools. The system memory 704, the removable storage device 709, and the non-removable storage device 710 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700. Computer storage media does not include a carrier wave or other propagated or modulated data signal.

Communication media may be embodied by computer readable instructions, data structures, program tools, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 8A:
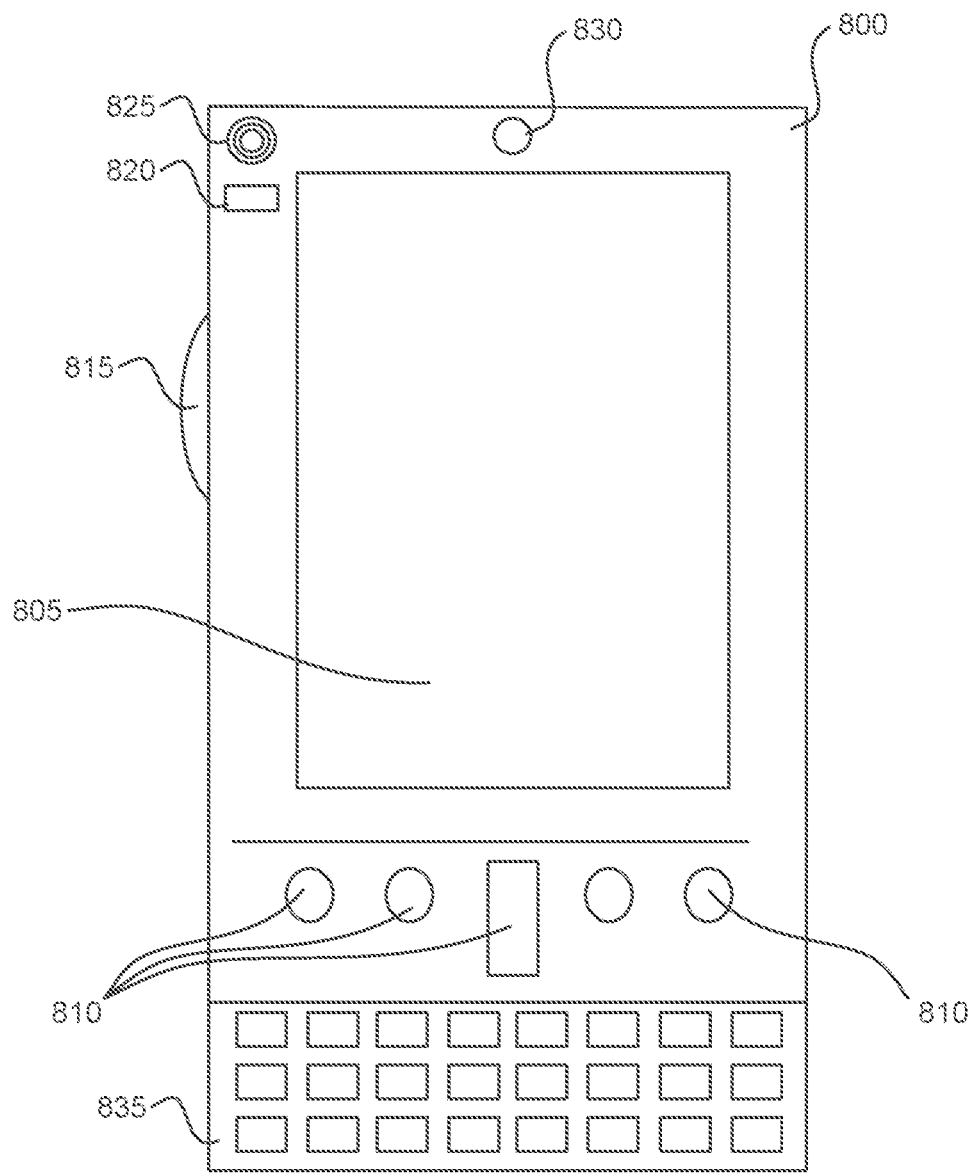
FIG. 8A is a simplified diagram of a mobile computing device with which aspects of the present disclosure may be practiced.
Figure 8B:
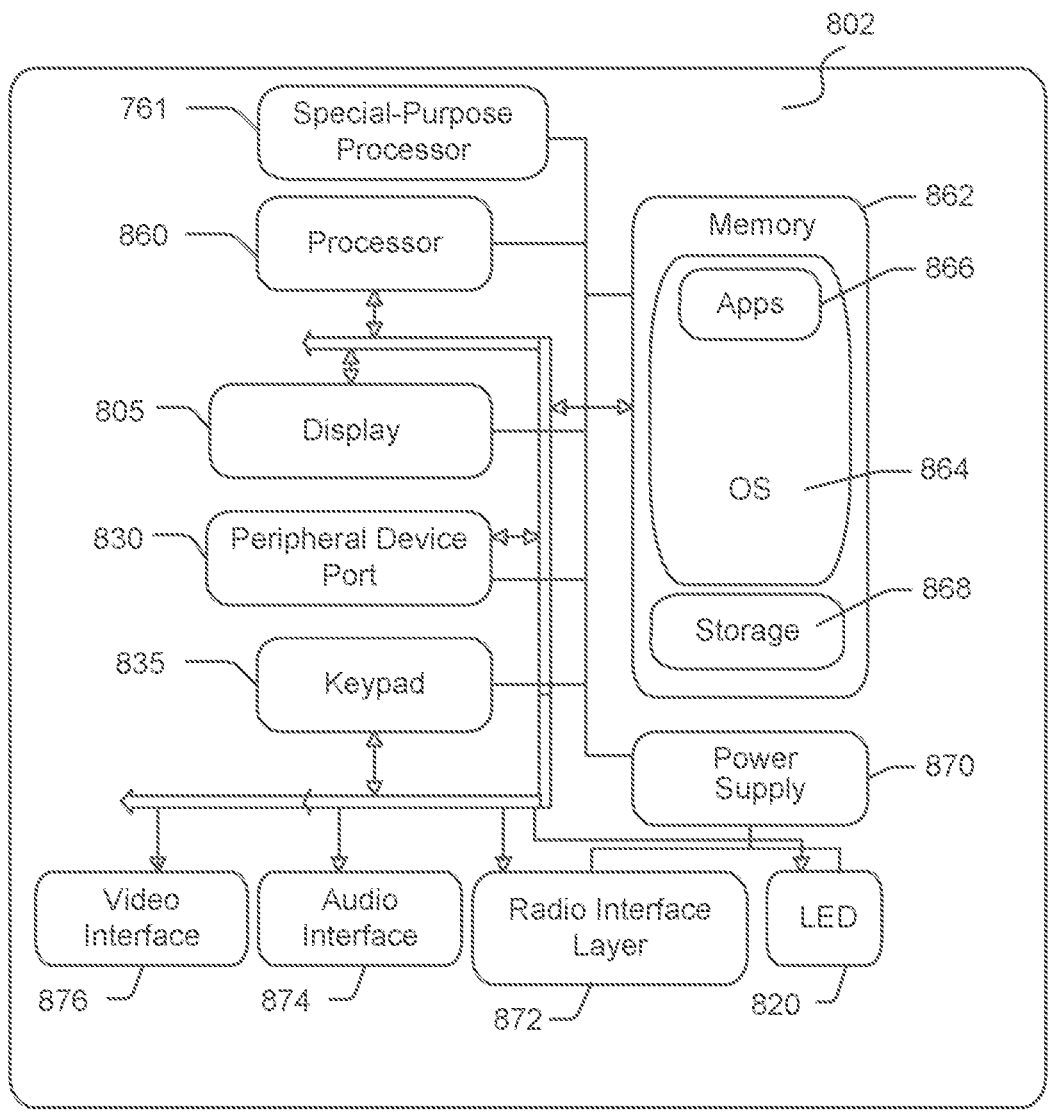
FIG. 8B is another simplified block diagram of a mobile computing device with which aspects of the present disclosure may be practiced.

FIGS. 8A and 8B illustrate a computing device or mobile computing device 800, for example, a mobile telephone, a smart phone, wearable computer (such as a smart watch), a tablet computer, a laptop computer, and the like, with which aspects of the disclosure may be practiced. In some aspects, the client utilized by a user (e.g., user of client device A 102A and user of client device B 102B in FIG. 1) may be a mobile computing device. With reference to FIG. 8A, one aspect of a mobile computing device 800 for implementing the aspects is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included as an optional input element, a side input element 815 allows further user input. The side input element 815 may be a rotary switch, a button, or any other type of manual input element. In alternative aspects, mobile computing device 800 may incorporate more or less input elements. For example, the display 805 may not be a touch screen in some aspects. In yet another alternative aspect, the mobile computing device 800 is a portable phone system, such as a cellular phone. The mobile computing device 800 may also include an optional keypad 835. Optional keypad 835 may be a physical keypad or a "soft" keypad generated on the touch screen display. In various aspects, the output elements include the display 805 for showing a graphical user interface (GUI), a visual indicator 820 (e.g., a light emitting diode), and/or an audio transducer 825 (e.g., a speaker). In some aspects, the mobile computing device 800 incorporates a vibration transducer for providing the user with tactile feedback. In yet another aspect, the mobile computing device 800 incorporates input and/or output ports, such as an audio input (e.g., a microphone jack), an audio output (e.g., a headphone jack), and a video output (e.g., a HDMI port) for sending signals to or receiving signals from an external device.

FIG. 8B is a block diagram illustrating the architecture of one aspect of computing device, a server (e.g., web server 102, web search server 114, and copy generator 120 in FIG. 1), a mobile computing device, etc. That is, the mobile computing device 800 can incorporate a system 802 (e.g., a system architecture) to implement some aspects. The system 802 can implemented as a "smart phone" capable of running one or more applications (e.g., browser, e-mail, calendaring, contact managers, messaging clients, games, and media clients/players). In some aspects, the system 802 is integrated as a computing device, such as an integrated digital assistant (PDA) and wireless phone.

One or more application programs 866 may be loaded into the memory 862 and run on or in association with the operating system 864. Examples of the application programs include phone dialer programs, e-mail programs, information management (PIM) programs, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 866 may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800 described herein.

The system 802 has a power supply 870, which may be implemented as one or more batteries. The power supply 870 might further include an external power source, such as an AC adapter or a powered docking cradle that supplements or recharges the batteries.

The system 802 may also include a radio interface layer 872 that performs the function of transmitting and receiving radio frequency communications. The radio interface layer 872 facilitates wireless connectivity between the system 802 and the "outside world," via a communications carrier or service provider. Transmissions to and from the radio interface layer 872 are conducted under control of the operating system 864. In other words, communications received by the radio interface layer 872 may be disseminated to the application programs 866 via the operating system 864, and vice versa.

The visual indicator 820 (e.g., LED) may be used to provide visual notifications, and/or an audio interface 874 may be used for producing audible notifications via the audio transducer 825. In the illustrated configuration, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with aspects of the present disclosure, the microphone may also serve as an audio sensor to facilitate control of notifications, as will be described below. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio interface layer 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio interface layer 872 or via a distributed computing network. Similarly, such data/information may be readily transferred between computing devices for storage and use according to well-known data/information transfer and storage means, including electronic mail and collaborative data/information sharing systems.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

As will be understood from the foregoing disclosure, one aspect of the technology relates to a computer-implemented method. The method comprises receiving, by a first computing device, data associated with a first application as an update to a media primitive in a first folio in the first computing device, wherein the first folio is a first user interactive entity for sharing the data based on user interactive interface being distinct from the first application, the first folio comprising the media primitive including content, the update relating to an addition of the content to the media primitive, and the first folio executing on the first computing device. Additionally, the method includes transmitting, by the first computing device, a first notification, wherein the first notification relates to synchronizing the first folio with a second folio based on the updated media primitive, the second folio being a second user interactive entity for accessing a second application with the data based on the user interactive interface that is distinct from a second application on the second computing device. The method further includes receiving, by the first computing device, a status of synchronizing the first folio with the second folio and providing, by the first computing device, the updated first folio through the user interactive interface on the first computing device based on the received status.

Another aspect of the technology relates to a computer-implemented method. The method comprises receiving, by a first computing device, data associated with a first application as an update to a tool in a first folio in the first computing device, wherein the first folio is a first user interactive entity for sharing the data based on user interactive interface being distinct from the first application, the first folio comprising the tool, the tool representing transition of data, the update relating to an addition of the data to the tool, and the first folio executing on the first computing device. Additionally, the method comprises transmitting, by the first computing device, a first notification, wherein the first notification relates to synchronizing the first folio with a second folio based on the updated tool, the second folio being a second interactive entity providing the user interactive interface executing on a second computing device, the second computing device being distinct from the first computing device, and providing, by the first computing device, the updated first folio on the first computing device.

In still further aspects, the technology relates to a system. The system comprises a processor and a memory storing computer-executable instructions that when executed by the processor cause the system to perform operations. The operations include receiving data associated with a first application as an update to a constituent of a first folio, the first folio being a first user interactive entity for sharing the data with a second folio based on user interactive interface that is distinct from the first application, the first folio executing on a first computing device. Additionally, the operation includes transmitting, by the first computing device, a first notification, wherein the first notification relates to synchronizing the first folio with the second folio based on the updated constituent, the second folio being a second user interactive entity for accessing a second application with the data based on the user interactive interface that is distinct from a second application on the second computing device, the first application and the second application being distinct. The operations further includes receiving, by the first computing device, a status of synchronizing the first folio with the second folio and providing, by the first computing device, the updated constituent of the first folio on the first computing device based on the received status.

Any of the one or more above aspects in combination with any other of the one or more aspect. Any of the one or more aspects as described herein.

What is claimed is:

1. A computer-implemented method, the method comprising:

receiving, by a first computing device, data associated with a first application as an update to a media primitive in a first folio in the first computing device, wherein the first folio is a first user interactive entity for sharing the data based on user interactive interface being distinct from the first application, the first folio comprising the media primitive including content, the update relating to an addition of the content to the media primitive, and the first folio executing on the first computing device;

transmitting, by the first computing device, a first notification, wherein the first notification relates to synchronizing the first folio with a second folio based on the updated media primitive, the second folio being a second user interactive entity for accessing a second application with the data based on the user interactive interface that is distinct from a second application on the second computing device;

receiving, by the first computing device, a status of synchronizing the first folio with the second folio; and providing, by the first computing device, the updated first folio through the user interactive interface on the first computing device based on the received status.

2. The computer-implemented method of claim 1, the method further comprising:

receiving, by the first computing device, a second notification, the second notification indicating a status of synchronizing the first folio with the second folio; and providing, by the first computing device, the status based on the second notification.

3. The computer-implemented method of claim 1, the method further comprising:

receiving data from a proximity sensor of the first computing device; and determining the second computing device based on the received data from the proximity sensor.

4. The computer-implemented method of claim 1, the method further comprising:

receiving a hovering input on the first computing device, wherein the hovering input is a user interactive input based on hovering of an input pointer with respect to rendering of the first folio; and displaying the first folio as an always-on-top, semi-transparent user interactive window based on the hovering input.

5. The computer-implemented method of claim 1, the method further comprising:

receiving, by the first computing device, a second notification, the second notification is based on a command to synchronizing the first folio with the second folio;

automatically updating the first folio and the content of the media primitive of the first folio based on the second folio;

providing, by the first computing device, the updated content of the media primitive.

6. The computer-implemented method of claim 1, wherein the media primitive comprises a placeholder of content, the placeholder relating to a location of content insertion within a document, the method further comprising:

receiving, by the first computing device, a second notification, the second notification is based on a command to synchronizing the first folio with the second folio;

receiving content based on the second folio;

replacing the placeholder of the content in the media primitive of the first folio with the received content based on the second folio;

automatically updating, by the first computing device, the document with the received content based on the second folio at the location of the content insertion within the document.

7. A computer-implemented method, the method comprising:

receiving, by a first computing device, data associated with a first application as an update to a tool in a first folio in the first computing device, wherein the first folio is a first user interactive entity for sharing the data based on user interactive interface being distinct from the first application, the first folio comprising the tool, the tool representing transition of data, the update relating to an addition of the data to the tool, and the first folio executing on the first computing device;

transmitting, by the first computing device, a first notification, wherein the first notification relates to synchronizing the first folio with a second folio based on the updated tool, the second folio being a second interactive entity providing the user interactive interface executing on a second computing device, the second computing device being distinct from the first computing device; and providing, by the first computing device, the updated first folio on the first computing device.

8. The computer-implemented method of claim 7, wherein the tool represents a telepointer and comprises location data of the telepointer, the method further comprising:

receiving a second notification, the second notification indicating a status of synchronizing the first folio and the second folio based on the tool representing the telepointer;

based on the received status of the synchronizing, receiving a location data of a pointer based on movement of an input device on the first computing device;

updating the location data of the telepointer in the tool based on the received location data of the pointer; and transmitting, by the first computing device, a third notification, the third notification relating to synchronizing as a cross-device fail-over between the first folio and the second folio based on the updated location data of the telepointer in the tool, causing the second computing device to render the telepointer based on the updated location data of the telepointer in the tool.

9. The computer-implemented method of claim 7, wherein the tool represents an image input device and comprises image data, the method further comprising:

receiving a second notification, the second notification indicating a status of synchronizing the first folio and the second folio based on the tool representing the image input device;

based on the received status of the synchronizing, receiving, by the first computing device, an image input from the image input device;

updating the image data of the tool based on the received image input; and transmitting, by the first computing device, a third notification, the third notification relating to synchronizing as a cross-device fail-over between the first folio and the second folio based on the updated image data of the tool, causing the second computing device to render the image data.

10. The computer-implemented method of claim 7, wherein the tool represents a color transmission device and comprises a color data, the method further comprising:

receiving a second notification, the second notification indicating a status of synchronizing the first folio and the second folio based on the tool representing the color transmission device;

based on the received status of the synchronizing, receiving a color input from the color transmission device on the first computing device;

updating the color data of the tool based on the received color input; and transmitting, by the first computing device, a third notification, the third notification relating to synchronizing as a cross-device fail-over between the first folio and the second folio based on the updated color data of the tool, causing the second computing device to render the color data.

11. The computer-implemented method of claim 7, the method further comprising:

receiving, by the first computing device, a second notification, the second notification indicating a status of synchronizing the first folio with the second folio; and providing, by the first computing device, the status based on the second notification.

12. The computer-implemented method of claim 7, the method further comprising:

receiving data from a proximity sensor of the first computing device; and determining the second computing device based on the received data from the proximity sensor.

13. The computer-implemented method of claim 7, the method further comprising:

receiving, by the first computing device, a hovering input on the first computing device, wherein the hovering input is a user interactive input based on hovering of an input pointer with respect to rendering of the first folio; and displaying the first folio as an always-on-top, semi-transparent user interactive window based on the hovering input.

14. The computer-implemented method of claim 7, the method further comprising:

receiving, by the first computing device, a second notification, the second notification is based on a command to synchronizing the first folio with the second folio;

automatically updating the first folio and the tool of the first folio based on the second folio;

providing, by the first computing device, the data of the updated tool.

15. A system, comprising:

a processor; and a memory storing computer-executable instructions that when executed by the processor cause the system to:

receive data associated with a first application as an update to a constituent of a first folio, the first folio being a first user interactive entity for sharing the data with a second folio based on user interactive interface that is distinct from the first application, the first folio executing on a first computing device;

transmit, by the first computing device, a first notification, wherein the first notification relates to synchronizing the first folio with the second folio based on the updated constituent, the second folio being a second user interactive entity for accessing a second application with the data based on the user interactive interface that is distinct from a second application on the second computing device, the first application and the second application being distinct;

receive, by the first computing device, a status of synchronizing the first folio with the second folio; and provide, by the first computing device, the updated constituent of the first folio on the first computing device based on the received status.

16. The system of claim 15, wherein the constituent of the first folio comprises a media primitive, the media primitive including content, and the update relating to an addition of the content to the media primitive.

17. The system of claim 15, wherein the constituent of the first folio comprises a media primitive, the media primitive including content, and the update relating to an update of the content to the media primitive.

18. The system of claim 15, wherein the constituent of the first folio comprises a media primitive, the media primitive including a placeholder of content, and the update relating to an update of the content to the media primitive, the placeholder relating to a location of content insertion within a document, and the computer-executable instructions when executed by the processor further cause the system to:

receive, by the first computing device, a second notification, the second notification is based on a command to synchronizing the first folio with the second folio;

receive content based on the second folio;

replace the placeholder of the content in the media primitive of the first folio with the received content based on the second folio;

automatically update, by the first computing device, the document with the received content based on the second folio at the location of the content insertion within the document.

19. The system of claim 15, wherein the constituent of the first folio comprises a tool, the tool including location data of a telepointer, the update relating to an update of the location data in the tool, and the computer-executable instructions when executed by the processor further cause the system to:

receive a second notification, the second notification indicating a status of synchronizing the first folio and the second folio based on the tool representing the telepointer;

based on the received status of the synchronizing, receive a location data of a pointer based on movement of an input device on the first computing device;

update the location data of the telepointer in the tool based on the received location data of the pointer; and transmit, by the first computing device, a third notification, the third notification relating to synchronizing as a cross-device fail-over between the first folio and the second folio based on the updated location data of the telepointer in the tool, causing the second computing device to render the telepointer based on the updated location data of the telepointer in the tool.

20. The system of claim 15, wherein the constituent of the first folio comprises a tool, the tool representing an image input device and comprising image data, the update relating to an update of the location data in the tool, and the computer-executable instructions when executed by the processor further cause the system to:

receive a second notification, the second notification indicating a status of synchronizing the first folio and the second folio based on the tool representing the image input device;

based on the received status of the synchronizing, receive an image input from the image input device on the first computing device;

update the image data of the tool based on the received image input; and transmit, by the first computing device, a third notification, the third notification relating to synchronizing as a cross-device fail-over between the first folio and the second folio based on the updated image data of the tool, causing the second computing device to render the image data.

* * * * *